(12) United States Patent
Aldhaher et al.

(10) Patent No.: US 12,316,139 B2
(45) Date of Patent: May 27, 2025

(54) WIRELESS POWER TRANSFER TRANSMITTER, SYSTEM AND METHOD OF WIRELESSLY TRANSFERRING POWER

(71) Applicant: Solace Power Inc., Mount Pearl (CA)

(72) Inventors: Samer Aldhaher, Mount Pearl (CA); Samuel Robert Cove, Mount Pearl (CA); Ahmad Almudallal, Mount Pearl (CA)

(73) Assignee: Solace Power Inc., Mount Pearl (CA)

( * ) Notice: Subject to any disclaimer, the term of this patent is extended or adjusted under 35 U.S.C. 154(b) by 8 days.

(21) Appl. No.: 17/193,539

(22) Filed: Mar. 5, 2021

(65) Prior Publication Data
US 2021/0281122 A1 Sep. 9, 2021

Related U.S. Application Data

(60) Provisional application No. 63/055,732, filed on Jul. 23, 2020, provisional application No. 62/986,000, filed on Mar. 6, 2020.

(51) Int. Cl.
*H02J 50/70* (2016.01)
*H01F 27/38* (2006.01)
(Continued)

(52) U.S. Cl.
CPC .............. *H02J 50/70* (2016.02); *H01F 27/38* (2013.01); *H01F 38/14* (2013.01); *H02J 50/12* (2016.02); *H02J 50/40* (2016.02)

(58) Field of Classification Search
CPC .. H02J 50/70; H02J 50/40; H02J 50/10; H02J 50/005; H02J 50/50; H02J 50/402;
(Continued)

(56) References Cited

U.S. PATENT DOCUMENTS

| 11,005,301 | B1* | 5/2021 | Tillotson | .............. H02J 50/80 |
| 2004/0098068 | A1* | 5/2004 | Carbunaru | .............. H04L 27/10 |
| | | | | 607/60 |

(Continued)

FOREIGN PATENT DOCUMENTS

| JP | 200642519 A | 2/2006 |
| JP | 2013102593 A | 5/2013 |

(Continued)

OTHER PUBLICATIONS

International Search Report, dated Jun. 3, 2021, issued in International Patent Application No. PCT/CA2021/050298.

(Continued)

*Primary Examiner* — Hal Kaplan
*Assistant Examiner* — Terrence R Willoughby
(74) *Attorney, Agent, or Firm* — Harness, Dickey & Pierce, P.L.C.

(57) ABSTRACT

An apparatus for use in a magnetic induction wireless power transfer system comprises at least one booster coil positioned adjacent an active coil of a magnetic induction wireless power transfer system and a capacitor electrically connected to the booster coil. A capacitance of the capacitor is selected such that a current in the booster coil is approximately equal to a current in the active coil during wireless power transfer. The apparatus may comprise at least one shielding coil positioned adjacent an active coil of a magnetic induction wireless power transfer system, a capacitor electrically connected to the shielding coil, and a conductor positioned adjacent the shielding coil opposite the active coil. The conductor encompasses the shielding coil.

12 Claims, 21 Drawing Sheets

(51) Int. Cl.
*H01F 38/14* (2006.01)
*H02J 50/12* (2016.01)
*H02J 50/40* (2016.01)

(58) Field of Classification Search
CPC ........ H01F 27/38; H01F 38/14; H01F 27/363; H01F 27/289; Y02T 10/70; Y02T 10/7072; Y02T 90/14
USPC .......................................................... 307/104
See application file for complete search history.

(56) References Cited

U.S. PATENT DOCUMENTS

| | | | | |
|---|---|---|---|---|
| 2005/0131495 | A1* | 6/2005 | Parramon | A61N 1/3787 607/33 |
| 2012/0223149 | A1* | 9/2012 | Kato | H01Q 1/38 235/492 |
| 2013/0313893 | A1* | 11/2013 | Ichikawa | B60L 53/36 307/104 |
| 2014/0252875 | A1* | 9/2014 | Lee | H02J 50/502 307/104 |
| 2014/0354068 | A1* | 12/2014 | Horiuchi | H02J 50/12 307/104 |
| 2015/0084427 | A1* | 3/2015 | Moon | H02J 50/402 307/104 |
| 2016/0284465 | A1* | 9/2016 | Maniktala | H02J 50/12 |
| 2016/0329748 | A1 | 11/2016 | White, II et al. | |
| 2018/0097401 | A1 | 4/2018 | Gaskill et al. | |
| 2019/0392984 | A1 | 12/2019 | Han et al. | |
| 2020/0119645 | A1* | 4/2020 | Hammond | H03K 4/72 |
| 2020/0381162 | A1* | 12/2020 | Eguchi | B60L 53/30 |
| 2021/0066950 | A1* | 3/2021 | Cai | H01F 38/14 |
| 2021/0083634 | A1 | 3/2021 | Aldhaher | |
| 2021/0305846 | A1* | 9/2021 | Hasaba | H01F 38/14 |

FOREIGN PATENT DOCUMENTS

| | | |
|---|---|---|
| JP | 2013207479 A | 10/2013 |
| JP | 2017153351 A | 8/2017 |
| KR | 10-20170088184 A | 8/2017 |

OTHER PUBLICATIONS

Japanese Office Action issued Mar. 11, 2025 in Japanese Patent Application No. 2022-553163.

* cited by examiner

WIRELESS POWER TRANSFER TRANSMITTER, SYSTEM AND METHOD OF WIRELESSLY TRANSFERRING POWER

RELATED APPLICATIONS

This application claims the benefit of U.S. Provisional Application No. 62/986,000 filed on Mar. 6, 2020 and U.S. Provisional Application No. 63/055,732 filed on Jul. 23, 2020, the entire contents of which are incorporated herein by reference.

FIELD

The subject disclosure relates generally to wireless power transfer and in particular, to an apparatus for use in a magnetic induction wireless power transfer system, wireless power transfer systems, and methods of wirelessly transferring power.

BACKGROUND

Wireless power transfer systems such as wireless chargers are becoming an increasingly important technology to enable the next generation of devices. The potential benefits and advantages offered by the technology is evident by the increasing number of manufacturers and companies investing in the technology.

A variety of wireless power transfer systems are known. A typical wireless power transfer system includes a power source electrically connected to a wireless power transmitter, and a wireless power receiver electrically connected to a load.

In magnetic induction systems, the transmitter has a transmitter coil with a certain inductance that transfers electrical energy from the power source to the receiver, which has a receiver coil with a certain inductance. Power transfer occurs due to coupling of magnetic fields between the coils or inductors of the transmitter and receiver. The range of these magnetic induction systems is limited, and the coils or inductors of the transmitter and receiver must be tightly coupled, i.e. have a coupling factor above 0.5 and be in optimal alignment for efficient power transfer.

There also exist resonant magnetic systems in which power is transferred due to coupling of magnetic fields between the coils or inductors of the transmitter and receiver. The transmitter and receiver inductors may be loosely coupled, i.e. have a coupling factor below 0.5. However, in resonant magnetic systems the inductors are resonated using at least one capacitor. Furthermore, in resonant magnetic systems, the transmitter is self-resonant and the receiver is self-resonant. The range of power transfer in resonant magnetic systems is increased over that of magnetic induction systems and alignment issues are rectified. While electromagnetic energy is produced in magnetic induction and resonant magnetic systems, the majority of power transfer occurs via the magnetic field. Little, if any, power is transferred via electric induction or resonant electric induction.

The Qi wireless charging standard is an exemplary implementation of a magnetic induction system. The Qi wireless charging standard is used in low power consumer electronics such as smart phones and wearable devices. Furthermore, low cost power converters, coils and integrated circuits are available for use in the Qi wireless charging standard. The Qi wireless charging standard operates in the kHz frequency range. Devices operate according to the Qi wireless charging standard have limited coupling range, require precise coil alignment and use ferrite-based coils, which can be heavy and fragile. Consequently, the application scope of the Qi wireless charging standard is limited.

In electrical induction systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. The inductor may be a coil. In resonant electric systems, the transmitter is self-resonant and the receiver is self-resonant. Resonant electric systems have an increased range of power transfer compared to that of electric induction systems and alignment issues are rectified. While electromagnetic energy is produced in electric induction and resonant electric systems, the majority of power transfer occurs via the electric field. Little, if any, power is transferred via magnetic induction or resonant magnetic induction.

While wireless power transfer systems are known, improvements are desired. It is therefore an object to provide a novel wireless power transfer transmitter, receiver, system and method of wirelessly transferring power.

This background serves only to set a scene to allow a person skilled in the art to better appreciate the following description. Therefore, none of the above discussion should necessarily be taken as an acknowledgement that that discussion is part of the state of the art or is common general knowledge.

SUMMARY

It should be appreciated that this summary is provided to introduce a selection of concepts in a simplified form that are further described below in the detailed description. This summary is not intended to be used to limit the scope of the claimed subject matter.

Accordingly, in one aspect there is provided an apparatus for use in a magnetic induction wireless power transfer system. The apparatus may shield components external to the system from magnetic field originating from or generated by the system. The apparatus may further strengthen the magnetic field originating from or generated by the system. The apparatus may further not affect the impedance of an active coil of the magnetic induction wireless power transfer system. The system may provide the benefit that an inverter associated with the active coil may not need to be retuned due to the introduction of the apparatus.

The apparatus may comprise a field shielding unit.

The apparatus may comprise at least one shielding coil positioned adjacent an active coil of a magnetic induction wireless power transfer system.

For the purposes of the subject disclosure, adjacent may be defined as defining generally parallel planes. The shielding coil may be adjacent the active coil, in that a major surface of the shielding coil is parallel with a plane defined by a major surface of the active coil.

The apparatus may further comprise a capacitor electrically connected to the shielding coil. The capacitor may be configured to set a resonant frequency of the apparatus.

The capacitor may be electrically connected to the shielding coil. The capacitance of the capacitor is selected such that the impedance or reactance of the active coil and the field shielding unit or apparatus is the same as the impedance or reactance of the active coil without the field shielding unit at the same operating frequency.

The field shielding coil and the capacitor may produce a net positive reactance. The conductive plate may produce a negative reactance. The capacitance of the capacitor may be selected such that the net positive reactance is equal to the negative reactance. As such, there may be a net zero reactance and no change to the impedance or reactance of the transmitter coil with and without the field shielding unit.

Maintaining the same impedance or reactance may ensure the wireless power transfer system does not need to be retuned. Retuning may increase costs and system setup time.

The apparatus may comprise a conductor positioned adjacent the shielding coil opposite the active coil. The conductor may encompass the shielding coil.

The conductor may comprise a conductive plate. The conductive plate may be generally planar.

A resonant frequency of the apparatus may be greater than a resonant frequency of the active coil.

A resonant frequency of the shielding coil may be less than or equal to a self-resonant frequency of the shielding coil.

A phase of a current in the shielding coil and a phase of a current in the active coil are approximately equal. In contrast, in existing shielding units, a current in a shielding unit or coil is generally out of phase (e.g. 180 degrees out of phase) with a current in the active coil of a wireless power transfer system (e.g. magnetic induction wireless power transfer system).

The shielding coil is configured to strengthen a magnetic field originating at or generated by the active coil. In contrast with existing shielding units, the combination of the shielding coil and the conductor ensure the impedance of the active coil is unaffected by the introduction of the apparatus.

The conductor may be configured to attenuate the magnetic field originating at or generated by the active coil.

The impedance of the active coil may remain generally constant upon removal of the apparatus. Similarly, the impedance of the active coil may remain generally constant upon use of the apparatus with the magnetic induction wireless power transfer system.

Parameters of the apparatus may be determined based on:

$$\frac{\omega^2 M_{12}^2}{r_{L_2} + j\omega L_2 + \frac{1}{j\omega C} + Z_{2gnd}} + Z_{1gnd} = 0$$

where ω is the resonant frequency of the apparatus,
where $M_{12}$ is mutual inductance between the shielding and the active coils,
where $r_{L2}$ is a resistance of the shielding coil,
where $L_2$ is an inductance of the shielding coil,
where C is a capacitance of the capacitor,
where $Z_{1gnd}$ is a reflected impedance of the conductor towards the active coil, and
where $Z_{2gnd}$ a reflected impedance of the conductor towards the shielding coil.

The apparatus may comprise two shielding coils. In particular, the apparatus may comprise a first shielding coil positioned adjacent the active coil of the magnetic induction wireless power transfer system. The apparatus may further comprise a second shielding coil positioned between the first shielding coil and the conductor.

The capacitor may be electrically connected to the first shielding coil, and the terminals of the second field shielding coil may be electrically shorted together to create a capacitive reflected impedance.

The capacitor may be electrically connected to the first shielding coil. The apparatus may further comprise a second capacitor electrically connected to the second field shielding coil.

Parameters of the apparatus may be determined based on:

$$\frac{\omega^2 M_{12}^2}{r_{L_2} + j\omega L_2 + \frac{1}{j\omega C} + \frac{\omega^2 M_{23}^2}{r_{L_3} + j\omega L_3 + Z_{3gnd}} + Z_{2gnd}} + \ldots$$

$$\ldots \ldots \frac{\omega^2 M_{13}^2}{r_{L_3} + j\omega L_3 + \frac{\omega^2 M_{23}^2}{r_{L_2} + j\omega L_2 + \frac{1}{j\omega C} + Z_{2gnd}} + Z_{3gnd}} + Z_{1gnd} = 0$$

where ω is the resonant frequency of the apparatus,
where $M_{12}$ is mutual inductance between the active coil and the first shielding coil,
where $M_{13}$ is mutual inductance between the active coil and the second shielding coil,
where $M_{23}$ is mutual inductance between the first and second shielding coils,
where $r_{L2}$ is a resistance of the first shielding coil,
where $L_2$ is an inductance of the first shielding coil,
where C is a capacitance of the capacitor,
where $Z_{1gnd}$ is a reflected impedance of the conductor towards the active coil,
where $Z_{2gnd}$ is a reflected impedance of the conductor towards the first shielding coil, and
where $Z_{3gnd}$ is a reflected impedance of the conductor towards the second shielding coil.

Parameters of the apparatus may be determined based on:

$$\frac{\omega^2 M_{12}^2}{r_{L_2} + j\omega L_2 + \frac{1}{j\omega C_1} + \frac{\omega^2 M_{23}^2}{r_{L_3} + j\omega L_3 + \frac{1}{j\omega C_2} + Z_{3gnd}} + Z_{2gnd}} + \ldots \ldots$$

$$\frac{\omega^2 M_{13}^2}{r_{L_3} + j\omega L_3 + \frac{1}{j\omega C_2} + \frac{\omega^2 M_{23}^2}{r_{L_2} + j\omega L_2 + \frac{1}{j\omega C_1} + Z_{2gnd}} + Z_{3gnd}} + Z_{1gnd} = 0$$

where ω is the resonant frequency of the apparatus,
where $M_{12}$ is mutual inductance between the active coil and the first shielding coil,
where $M_{13}$ is mutual inductance between the active coil and the second shielding coil,
where, $M_{23}$ is mutual inductance between the first and second shielding coils,
where $r_{L2}$ is a resistance of the first shielding coil,
where $L_2$ is an inductance of the first shielding coil,
where C is a capacitance of the capacitor,
where $Z_{1gnd}$ is a reflected impedance of the conductor towards the active coil,
where $Z_{2gnd}$ is a reflected impedance of the conductor towards the first shielding coil, and
where $Z_{13gnd}$ is a reflected impedance of the conductor towards the second shielding coil.

The active coil may be a transmitter or receiver coil. The transmitter coil may form part of a transmitter of the magnetic induction wireless power transfer system. The receiver coil may form part of a receiver of the magnetic induction wireless power transfer system.

The wireless power system may be a high frequency magnetic wireless power transfer system.

According to another aspect there is provided a wireless power transfer system for transferring power via magnetic field coupling. The system may comprise a transmitter coil for transferring power via magnetic field coupling, and a receiver coil for extracting power from the transmitter coil via magnetic field coupling. The system may further comprise at least one of the described apparatus. The shield coil of the apparatus may be positioned adjacent at least one of the transmitter coil and receiver coil.

According to another aspect there is provided a method of shielding an active coil of a magnetic induction wireless power transfer system. The method may shield components external to the system from magnetic field originating from or generated by the system. The method may further strengthen the magnetic field originating from or generated by the system. The method may further not affect the impedance of an active coil of the magnetic induction wireless power transfer system, i.e. an inverter associated with the active coil may not need to be retuned due to the introduction of the apparatus.

The method may comprise positioning at least one shielding coil adjacent the active coil of the magnetic induction wireless power transfer system, a conductor electrically connected to the shielding coil; and positioning the conductor adjacent the shielding coil opposite the active coil such that the conductor encompasses the shielding coil.

The shielding coil may be as previously described. The conductor may be as previously described.

According to another aspect there is provided a method of wirelessly transferring power via magnetic induction.

The method may comprise generating a magnetic field at a transmitter coil to transfer power to a receiver coil via magnetic field coupling.

The method may further comprise strengthening the generated magnetic field via at least one shielding coil positioned adjacent the transmitter coil opposite the receiver coil.

The method may further comprise attenuating the generated magnetic field via a conductor positioned adjacent the shielding coil opposite the transmitter coil, the conductor encompassing the shielding coil.

According to another aspect there is provided an apparatus for use in a magnetic induction wireless power transfer system, the apparatus comprising: at least one booster coil positioned adjacent an active coil of a magnetic induction wireless power transfer system; and a capacitor electrically connected to the booster coil, a capacitance of the capacitor selected such that a current in the booster coil is approximately equal to a current in the active coil during wireless power transfer.

The capacitance of the capacitor may be selected such that the apparatus generates a net positive reactance.

The capacitance of the capacitor may be selected such that an impedance or reactance of the active coil is increased.

A plane of the active coil may be parallel with a plane of the booster coil. The plane may be defined as the major object plane of the active coil, and similarly the major object plane of the booster coil.

The apparatus may further comprise a conductor positioned adjacent the booster coil opposite the active coil, the conductor encompassing the booster coil.

A plane of the conductor may be parallel with a plane of the active coil and/or the booster coil. The plane may be defined as the major object plane of the conductor.

The conductor may be configured to attenuate the magnetic field originating at the active coil.

The conductor may be a conductive plate.

A distance between the booster coil and the active coil and a distance between the booster coil and the conductor may be selected such that: a required capacitance of the capacitor and eddy current losses in the conductor are optimized.

The apparatus may be configured to increase a magnetic field generated by the active coil by a factor of approximately two.

The active coil may be a transmitter or receiver coil.

The wireless power system may be a high frequency magnetic wireless power transfer system.

A resonant frequency of the apparatus may be higher than an operating frequency of the wireless power transfer system.

The booster coil has the same shape and dimension as the active coil. The booster coil may have a different shape and/or dimension than the active coil. For example, the active coil may have a generally square planar shape, and the booster coil may have a generally circular planar shape.

The apparatus may comprise a plurality of booster coils. For example, the apparatus may comprise four (4) booster coils.

The booster coils may be configured to be encompassed by the active coil.

The booster coils may be configured to increase a magnetic field generated by the active coil according to a magnetic field profile.

According to another aspect there is provided, an apparatus for use in a magnetic induction wireless power transfer system, the apparatus comprising: at least one shielding coil positioned adjacent an active coil of a magnetic induction wireless power transfer system; a capacitor electrically connected to the shielding coil; and a conductor positioned adjacent the shielding coil opposite the active coil, the conductor encompassing the shielding coil.

According to another aspect there is provided, a wireless power transfer system for transferring power via magnetic field coupling, the system comprising: a transmitter coil for transferring power via magnetic field coupling, a receiver coil for extracting power from the transmitter coil via magnetic field coupling, and at least one apparatus comprising: at least one shielding coil positioned adjacent the transmitter coil or the receiver coil; a capacitor electrically connected to the shielding coil; and a conductor positioned adjacent the shielding coil opposite the transmitter or receiver coil, the conductor encompassing the shielding coil.

According to another aspect there is provided, a method of shielding an active coil of a magnetic induction wireless power transfer system, the method comprising: positioning at least one shielding coil adjacent the active coil of the magnetic induction wireless power transfer system, a conductor electrically connected to the shielding coil; and positioning the conductor adjacent the shielding coil opposite the active coil such that the conductor encompasses the shielding coil.

According to another aspect there is provided, a method of wirelessly transferring power via magnetic induction, the method comprising: generating a magnetic field at a transmitter coil to transfer power to a receiver coil via magnetic field coupling; strengthening the generated magnetic field via at least one shielding coil positioned adjacent the transmitter coil opposite the receiver coil; and attenuating the generated magnetic field via a conductor positioned adjacent the shielding coil opposite the transmitter coil, the conductor encompassing the shielding coil.

According to another aspect there is provided, a method of wirelessly transferring power via magnetic induction, the method comprising: generating a magnetic field at a transmitter coil to transfer power to a receiver coil via magnetic field coupling; and strengthening the generated magnetic field via at least one booster coil positioned adjacent the transmitter coil opposite the receiver coil, a capacitor electrically connected to the booster coil, a capacitance of the capacitor selected such that a current in the booster coil is approximately equal to a current in the active coil during wireless power transfer.

It should be understood that any features described in relation to one aspect, example or embodiment may also be used in relation to any other aspect, example or embodiment of the present disclosure. Other advantages of the present disclosure may become apparent to a person skilled in the art from the detailed description in association with the following drawings.

BRIEF DESCRIPTION OF THE DRAWINGS

Embodiments will now be described more fully with reference to the accompanying drawings in which.

DETAILED DESCRIPTION OF EMBODIMENTS

Figure 1:
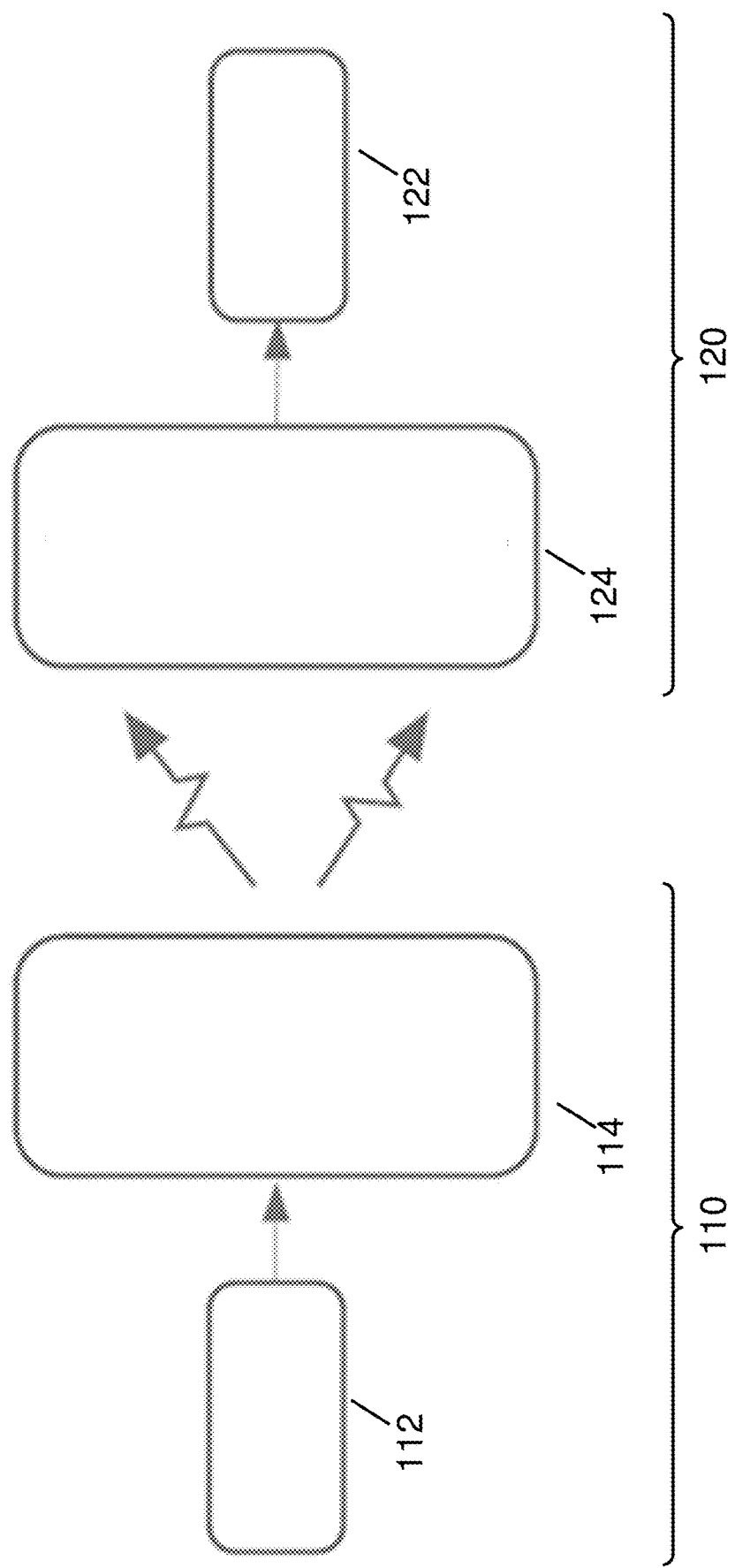
FIG. 1 is a block diagram of a wireless power transfer system.

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings. It will also be appreciated that like reference characters will be used to refer to like elements throughout the description and drawings.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the subject disclosure that elements, components, and/or other subject matter that is described as being adapted to perform a particular function may additionally or alternatively be described as being configured to perform that function, and vice versa. Similarly, subject matter that is described as being configured to perform a particular function may additionally or alternatively be described as being operative to perform that function.

It will be understood that when an element is referred to as being "on," "attached" to, "connected" to, "coupled" with, "contacting," etc., another element, it can be directly on, attached to, connected to, coupled with or contacting the other element or intervening elements may also be present.

It should be understood that use of the word "exemplary", unless otherwise stated, means 'by way of example' or 'one example', rather than meaning a preferred or optimal design or implementation.

As used herein, the terms "approximately", "about", "generally", "substantially" etc. represent an amount or characteristic close to the stated amount or characteristic that still performs the desired function or achieves the desired result. For example, the terms "approximately" and "about" in reference to a stated amount would include amounts that are within engineering or design tolerances of the stated number that would be readily appreciated by a person skilled in the art. Similarly, for example, the term "substantially" in reference to a stated characteristic would include elements that nearly completely provide the stated characteristic, and the term "generally" in reference to a stated characteristic would include elements that predominately provide the stated characteristic.

Unless otherwise indicated, the terms "first", "second" etc. are used herein merely as labels, and are not intended to impose ordinal, positional, or hierarchical requirements on the elements to which these terms refer. Moreover, reference to a "second" element does not require or preclude the existence of a lower-numbered element (e.g., a "first" element) and/or a higher-numbered element (e.g., a "third" element).

Turning now to FIG. 1, a wireless power transfer system is shown, generally identified by reference numeral 100. The wireless power transfer system 100 comprises a transmitter 110 comprising a power source 112 electrically connected to a transmit element 114, and a receiver 120 comprising a receive element 124 electrically connected to a load 122. Power is transferred from the power source 112 to the transmit element 114. The power is then transferred from the transmit element 114 to the receive element 124 via high frequency, resonant or non-resonant electric or magnetic field coupling. The power is then transferred from the receive element 124 to the load 122.

Figure 2:
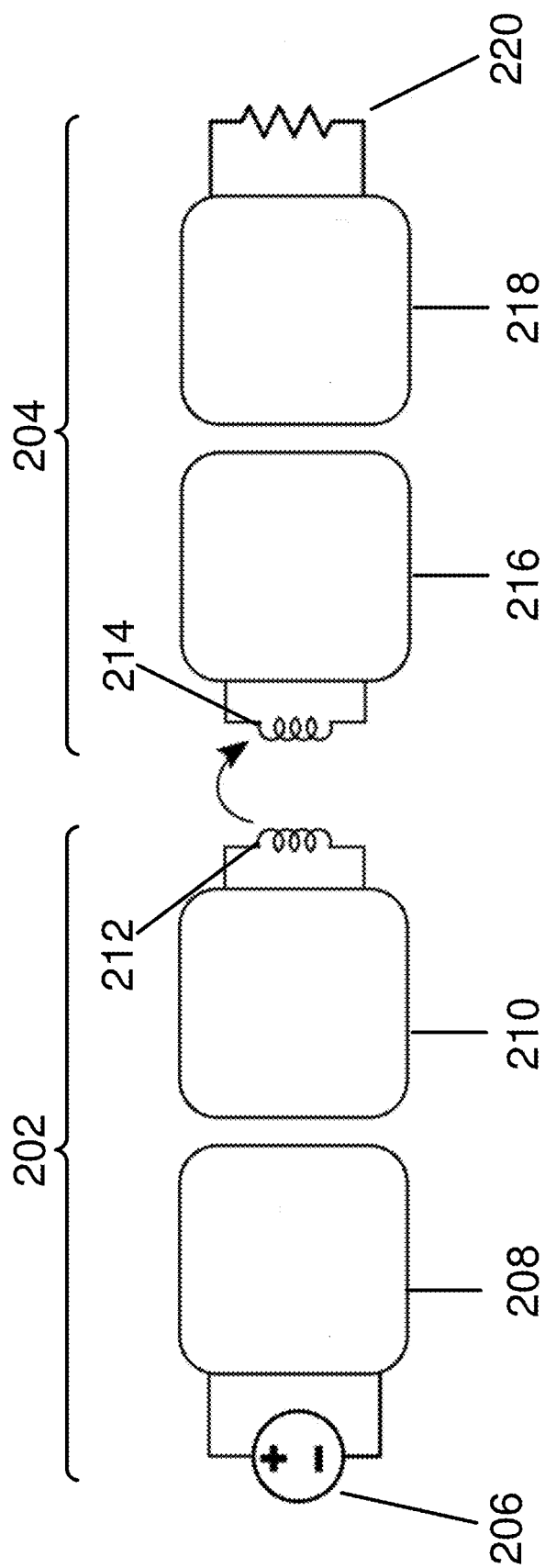
FIG. 2 is a block diagram of an inductive wireless power transfer system.

FIG. 2 shows a magnetic induction (h-field) wireless power transfer system generally identified as reference numeral 200.

The wireless power transfer system 200 comprises a transmitter 202 and a receiver 204. As will be described, the wireless power system 200 operates by transferring power from the transmitter 202 to a receiver 204. The transmitter 202 is configured to transmit power wirelessly via magnetic field or magnetic inductive coupling as will be described. While an electric field may also be generated, little, if any, power is transferred via electric field coupling.

The transmitter 202 comprises a power source 206, a transmitter DC/DC converter 208, a DC/AC inverter 210 and transmitter coil or inductor 212. The power source 206 is electrically connected to the transmitter DC/DC converter 208. The power source 206 is configured to generate a DC power signal. The power source 206 is configured to output the DC power signal to the transmitter DC/DC converter 208. In this embodiment, the DC power signal is between 24 V and 48 V. The transmitter DC/DC converter 208 is electrically connected to the power source 206. The transmitter DC/DC converter 208 is electrically connected to the DC/AC inverter 210. The transmitter DC/DC converter 208 interfaces the power source 206 to the DC/AC inverter 210.

The transmitter DC/DC converter 208 is configured to convert the DC power signal from the power source 206 to a voltage level for transmission to the DC/AC inverter 210.

The DC/AC inverter 210 is electrically connected to the transmitter DC/DC converter 208. The DC/AC inverter 210 is electrically connected to the transmitter coil 212. The DC/AC inverter 210 is configured to convert the DC power signal from the transmitter DC/DC converter 208 into a sinusoidal radio frequency (RF) power signal. The sinusoidal RF power signal is output from the DC/AC converter 210 to the transmitter coil 212.

The receiver 204 is configured to extract power from the transmitter 202 via magnetic inductive coupling as will be described. While an electric field may also be generated, little, if any, power is extracted via electric field coupling.

The receiver 204 comprises a receiver coil 214, an AC/DC rectifier 216, a receiver DC/DC converter 218 and a load 220. The receiver coil 214 is electrically connected to the AC/DC rectifier 216. The receiver coil 214 is configured to receive power from the transmitter 202 via the transmitter coil 212 using high frequency magnetic inductive coupling. For the purpose of the subject disclosure, high frequency is defined as 6.78 MHz or higher frequencies. This includes 13.56 MHz and higher frequencies. Furthermore, frequency refers to the operating frequency of the wireless power transfer system. Accordingly, a high frequency magnetic induction system transmits power via magnetic inductive coupling from the transmitter coil 212 to the receiver coil 214 at a frequency of 13.56 MHz, for example. One of skill in the art will appreciate that the frequency of the system need not be precisely 6.78 MHz or 13.56 MHz. High frequency includes frequencies in the megahertz (MHz) range and above. High frequency further includes frequencies in International Telecommunication Union (ITU)'s band number 7 (HF) which is 3 to 30 MHz and above.

The AC/DC rectifier 216 is electrically connected to the receiver coil 214. The AC/DC rectifier 216 is electrically connected to the receiver DC/DC converter 218. The AC/DC rectifier 216 is configured to convert sinusoidal RF power signal from the receiver coil 214 to a DC power signal. The AC/DC rectifier 216 is configured to output the DC power signal to the receiver DC/DC converter 218.

The receiver DC/DC converter 218 is electrically connected to the AC/DC rectifier 216. The receiver DC/DC converter 218 is electrically connected to the load 220. The DC power signal is output from the AC/DC rectifier 216 to the receiver DC/DC converter 218. The receiver DC/DC converter 218 interfaces the AC/DC rectifier 216 to the load 220. The receiver DC/DC converter 218 is configured to convert the received DC power signal. The converted DC power signal is output from the receiver DC/DC converter 218 to the load 220. The load 220 is electrically connected to the receiver DC/DC converter 218. The load 220 may be a fixed or a variable load.

While the receiver 204 has been described as comprising the receiver DC/DC converter 218, one of skill in the art will appreciate that other configurations are possible. In another embodiment, the receiver 204 does not comprise the receiver DC/DC converter 218. In this embodiment, the AC/DC rectifier 216 is electrically connected to the load 220. The AC/DC rectifier 216 is configured to generate a DC power signal that is acceptable to the load 220.

The receiver 204 operates at a given frequency. In this embodiment, the operating frequency of the receiver 204 is the operating frequency of the transmitter 202. In this embodiment, the operating frequency of the receiver 204 is 13.56 MHz, which qualifies the system as a high frequency system as previously defined.

Figure 3A:
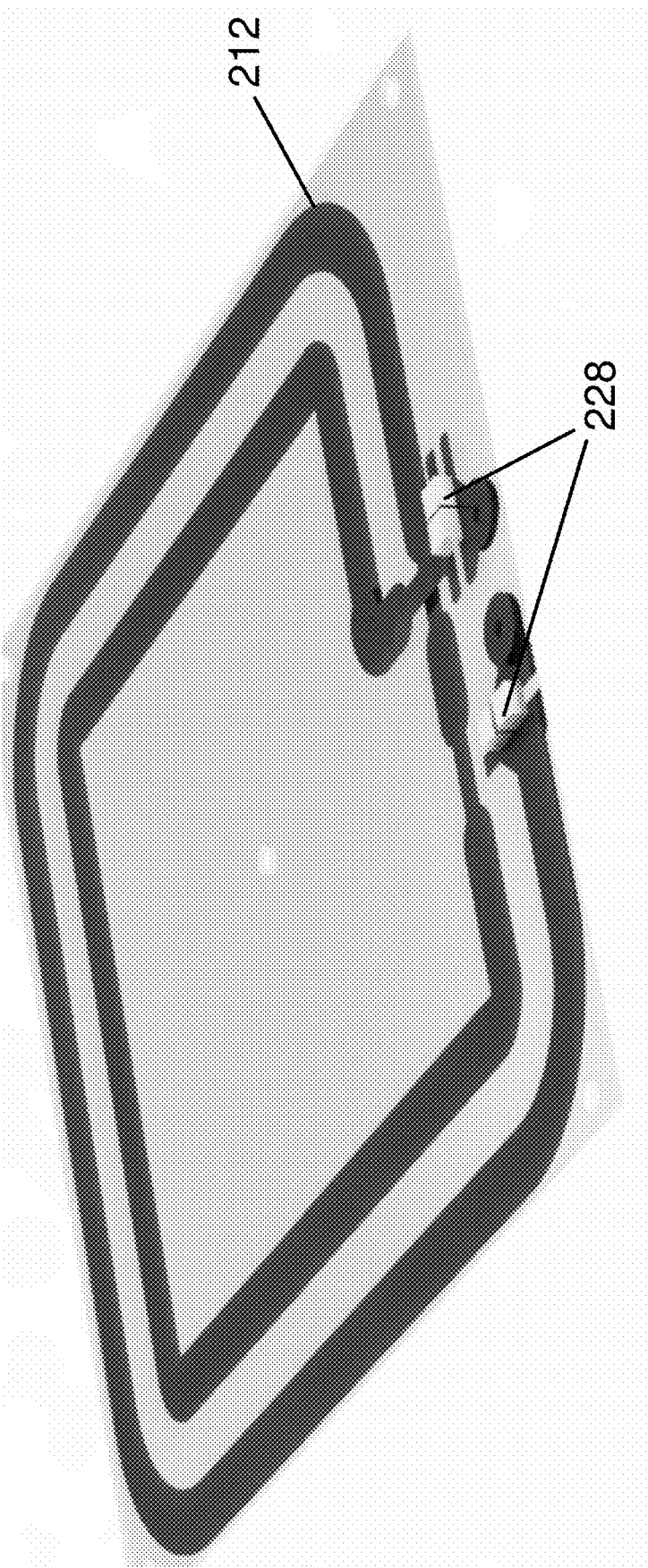
FIG. 3A is a perspective view of a transmitter coil of the wireless power transfer system of FIG. 2.

Turning now to FIG. 3A, transmitter coil 202 of the system 200 is shown. In this embodiment, the transmitter coil 212 is circular and consists of two turns of copper traces on an FR4 printed circuit board (PCB). The transmitter coil 212 has an inductance of approximately 1.50 uH. The transmitter coil has two capacitors 228 electrically connected across its terminals. While a generally rectangular transmitter coil 212 with rounded corners is described, one of skill in the art will appreciate that other shapes may be used, such as square, spiral, rectangular, or circular.

Figure 3B:
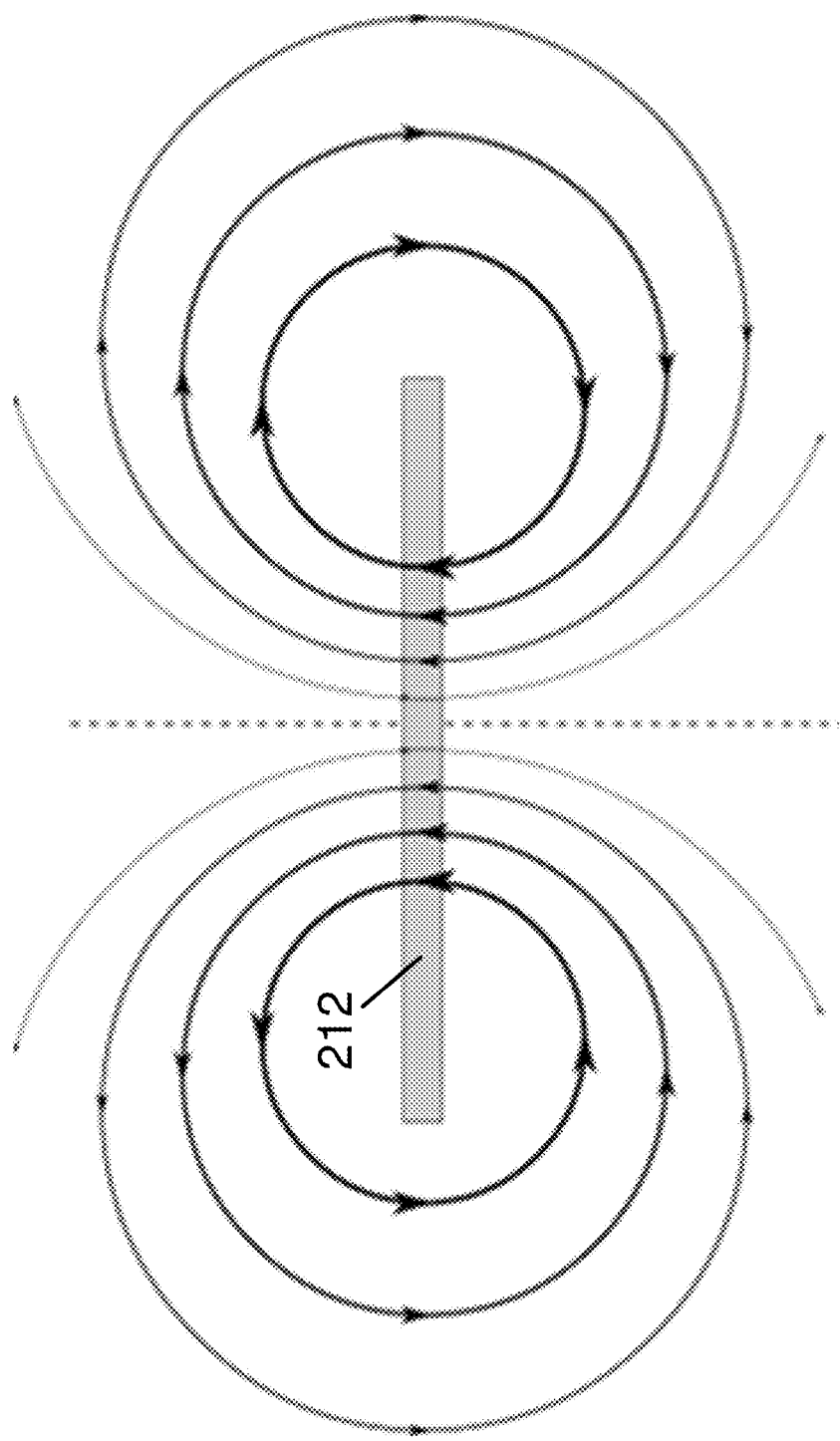
FIG. 3B is a magnetic field plot taken along the x-y axis of the transmitter coil of FIG. 3A without field shielding.

FIG. 3B shows the magnetic field plot of the transmitter coil 212 of the system 200 from FIG. 3A without field shielding or cancelling. The transmitter coil 212 is shown with the magnetic field illustrated by circular lines. The direction of the magnetic field is represented by the arrows. As shown, the magnetic field emits in both directions from the coil, top and bottom. The magnetic field is not confined to the area within the transmitter coil 212, allowing magnetic fields to radiate around the magnetic coil 212 in multiple directions. While not shown in the figure, the magnetic field radiates around the transmitter 212 in all directions in three-dimensional space.

Figure 3C:
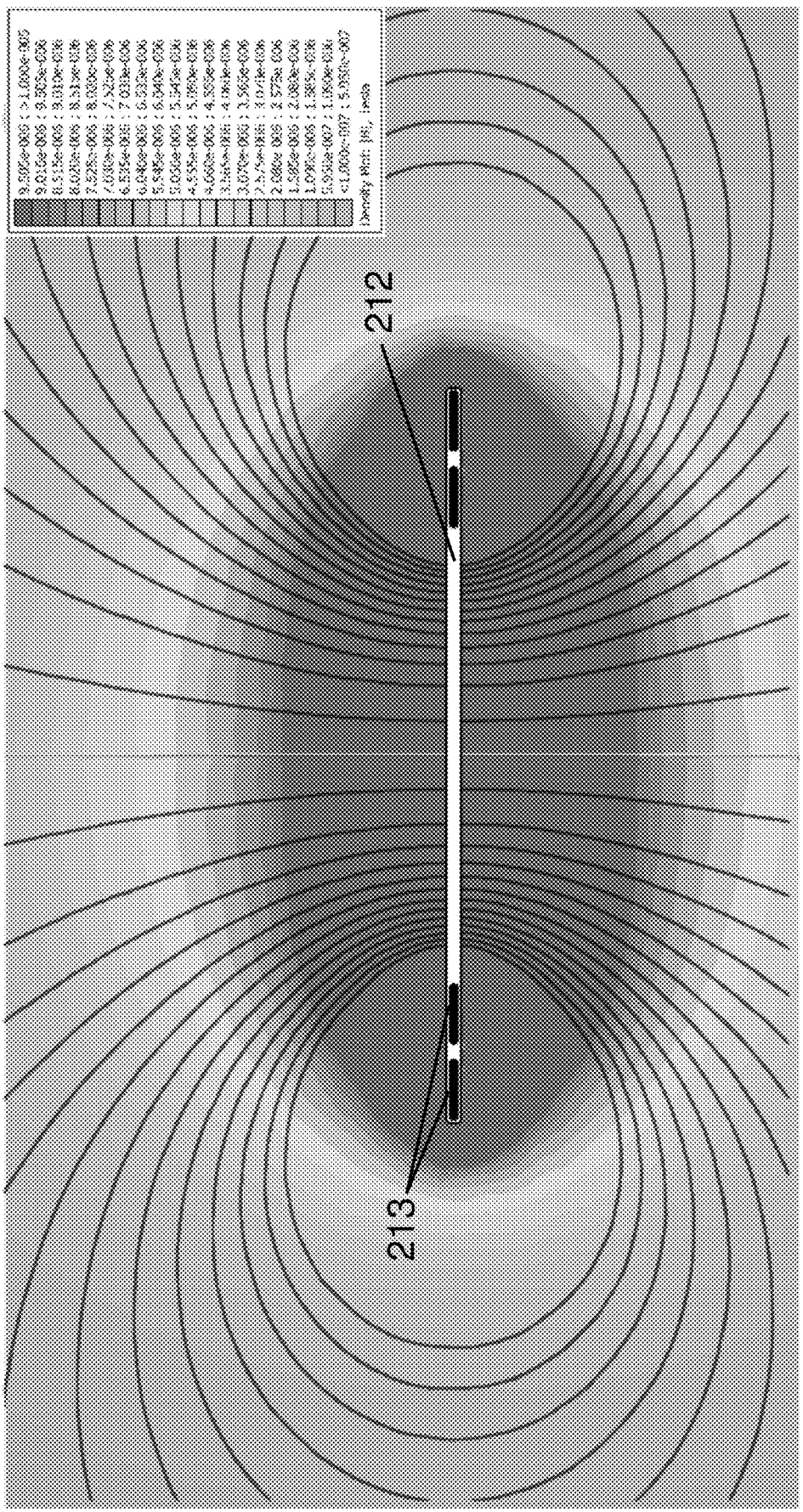
FIG. 3C is a finite element method (FEM) simulation of a magnetic field plot taken along the x-z axis of the transmitter coil of FIG. 3A without field shielding.

FIG. 3C is an FEM simulation of a transmitter coil 212 without a field shielding unit. For the purposes of this simulation, the transmitter coil 212 is comprised of two copper tracks 213. One of skill in the art will recognize that the coil 212 can have any number of turns. The simulation shows the magnetic field plot from a transmitter coil 212 without field shielding or cancelling. FIG. 3C shows that the magnetic field emits from either side of the transmitter coil 212. The transmitter coil 212 is shown with the magnetic field illustrated by circular lines.

In the described magnetic induction (h-field) wireless power transfer system 200 field shielding against the magnetic field produced by the wireless power system 200 may be an important aspect when designing the system 200. As shown in FIG. 3C, without field shielding the magnetic field produced by the transmitter and receiver coils (or inductors) 212 and 214, respectively, are radiated in all directions away from the coils or inductors. Although some of the magnetic field stays confined within the area between the transmitter and receiver coils 212 and 214, respectively, a large portion of it is not confined and therefore couples into the surrounding environment. This may cause unwanted coupling and transfer of energy into other objects, inducing eddy currents in conductive objects and heating of tissue. All these cause energy losses, and may lead to failure to meet EMI/EMC requirements as well as ICNIRP/IEEE field exposure limits. Traditional solutions, such as Qi systems, rely on ferrite for field shielding, due to its high magnetic permeability. However, ferrite is a heavy and fragile material, and is not efficient at MHz frequencies. It is generally understood by those skilled in the art that the two main loss mechanisms in ferrite and magnetics are eddy current loss and hysteresis loss, both of which are related to frequency and magnetic permeability. The higher the frequency the higher the loss. In particular, magnetic permeability of ferrite is inefficient at MHz frequencies and a larger airgap between the ferrite and the coils may be required. This may increase the size of the system 200. Furthermore, eddy current and hysteresis losses in the ferrite increase as the frequency increases. At MHz frequencies these losses may result in a system that is inefficient and potentially unusable for power transfer.

It is generally known to one of skill in the art that to cancel currents or voltage, an equal and opposite current or voltage can be applied, in which case, the opposing current or voltage would have to be 180 degrees out of phase with the current or voltage to be cancelled. The same is true for soundwaves, frequencies, or force, for example. Similarly, current magnetic field cancellation methods involve changing the phase of the magnetic field emitted by the transmitter coil 212 so that the phase of the current in the cancellation coil 180 degrees out of phase with the current in the transmitter coil 212. With known magnetic field cancellation technology and methods in magnetic induction systems, the current in the field cancellation coils is 180 degrees out of phase as compared to the current in the transmitter coil 212. This method is commonly known as 'field cancellation', since the current in the cancellation coils is 180 degrees out of phase with the current in the transmitter coil 212, and effectively cancels the field of the transmitter coil 212 towards the field cancellation coil.

Disclosed is a field shielding unit or apparatus for a wireless power transfer system. The field shielding unit limits the radiating magnetic field to the area or volume required for wireless power transfer as will be described.

The field shielding unit is for use with a magnetic induction wireless power transfer system. For example, magnetic induction wireless power transfer systems include, non-resonant magnetic systems, resonant magnetic systems, high frequency magnetic induction systems. Magnetic field (magnetic induction) wireless power transfer systems use magnetic coils to transfer power from a transmitter to a receiver using magnetic inductive coupling. While electric fields may also be generated, little, if any power is transferred using electric inductive coupling.

In this embodiment, the field shielding unit is implemented with a high-frequency magnetic induction wireless power transfer system. In another embodiment, the system is a low frequency magnetic induction wireless power transfer system. In another embodiment the system is a resonant magnetic induction wireless power transfer system. In yet another embodiment, the system is a magnetic induction system.

Figure 4A:
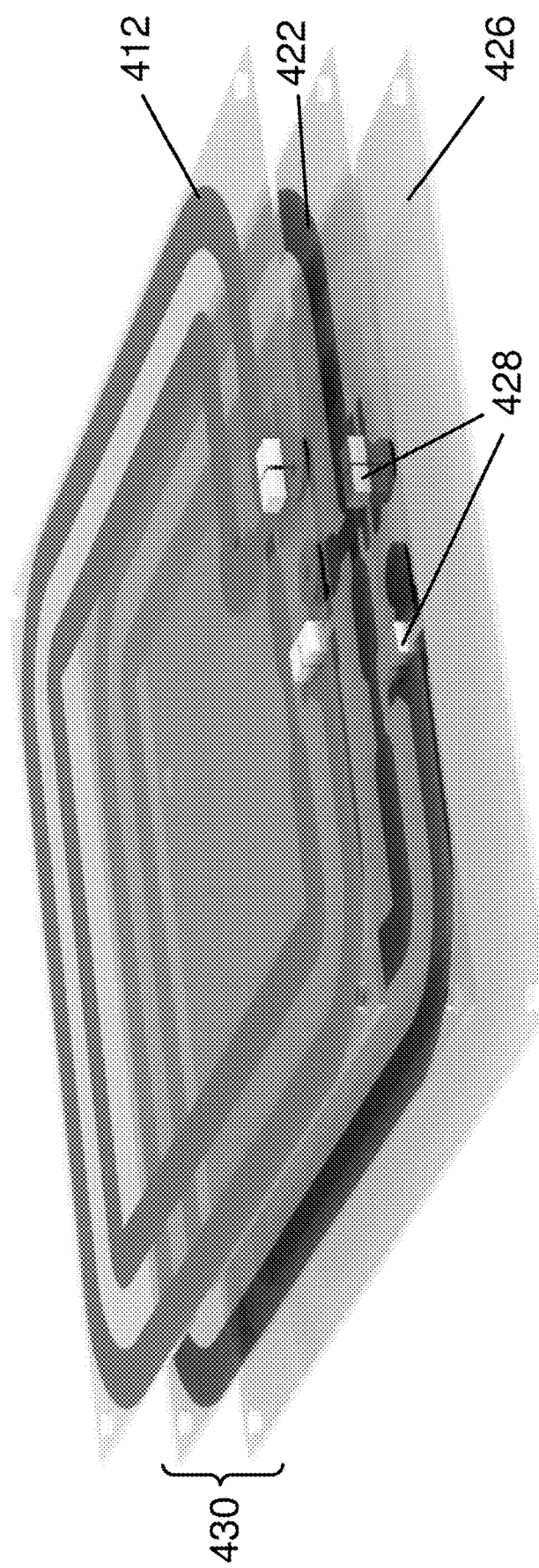
FIG. 4A is a perspective view of a shielding unit and a transmitter coil in accordance with an aspect of the disclosure.

Turning now to FIG. 4A, a field shielding unit 430 or apparatus for use in a magnetic induction wireless power transfer system is shown in accordance with one aspect of the disclosure. In this embodiment, the field shielding unit 430 comprises a single field shielding coil 422 and a conductive plate or conductor 426. The field shielding coil 422 is electrically connected to a discrete capacitor 428. The capacitor 428 is external to the field shielding coil 422. The capacitor 428 is electrically connected across the two terminals of the field shielding coil 422.

The field shielding coil 422 is configured to strengthen or increase the magnetic field generated by the transmitter coil 412. Specifically, the field shielding coil 422 is configured to increase the magnitude of the magnetic field generated by the transmitter coil 412. The conductive plate 426 is configured to at least partially attenuate or block the magnetic field generated by the transmitter coil 412 in a direction generally opposite a receiver coil relative to the transmitter coil 412. The conductive plate 426 is sized and positioned to encompass the field shielding coil 422.

For the purposes of the subject disclosure, the conductive plate 426 is said to encompass the field shielding coil 422 when at least one of the following conditions exists: (i) if the area defined by the perimeter of the field shielding coil 422 is projected onto the area of the conductive plate 426, the projection is entirely within the area of the conductive plate 426; (ii) the projected area of the field shielding coil 422 is circumscribed by the area of the conductive plate 426; and (iii) the area of the conductive plate 426 is greater than the total area defined by the perimeter of the field shielding coil 422 by at least the distance between the field shielding coil 422 and the conductive plate 426.

The field shielding apparatus 430 is positioned such that a plane formed by the field shielding coil 422 is parallel with a plane formed by the transmitter coil 412. The plane formed by the field shielding coil 422 is also parallel with a plane formed by the conducive plate 426. The plane formed by the conductive plate 426 is parallel with the plane formed by the transmitter coil 412. Thus, planes formed by the coils 412, 422 and the plate 426 are all parallel.

The plane of any one of the coils 412, 422 and plate 426 may be defined as a major object plane of the particular element.

The field shielding apparatus 430 is positioned such that the field shielding coil 422 is opposite a receiver coil with respect to the transmitter coil 412. The receiver coil is part of a wireless power transfer system of which the transmitter coil 412 forms a part. The positioning of the field shielding apparatus 430 is such that the field shielding coil 422 is adjacent one side of the transmitter coil 412 while a receiver coil is adjacent another, opposite side of the transmitter coil 412. The transmitter coil 412 is adjacent one side of the shielding coil 422, and the conductive plate 426 is adjacent to the other side of the shielding coil 422.

The capacitor 428 is configured to set the resonant frequency of the field shielding coil 422. The field shielding coil 422 is tuned to a different frequency than the frequency of operation of the transmitter coil 412 of the wireless power transfer system 200. The field shielding coil 422 is tuned to a frequency that is higher than the frequency of operation of the transmitter coil 412. In particular, the capacitance of the capacitor 428 is calculated according to $$f = \frac{1}{2\pi\sqrt{LC}}$$

such that the resonant frequency of the field shielding coil 422 is higher than the operating frequency of the wireless power transfer system 200.

The field shielding coil 430 is in phase with the transmitter coil 412. Having the field shielding coil 422 tuned to a higher frequency than the transmitter coil 412 ensures that the current in the shielding coil 422 is in phase, and not 180 degrees out of phase, with the current in the transmitter coil 412. The higher frequency of the field shielding coil 422 compared to the transmitter coil 412 ensures that the current in the field shielding coil 422 is in phase with the current in the transmitter coil 412. The field shielding coil 422 is not tuned to the same frequency as the transmitter coil 412. Tuning the field shielding coil 422 to the frequency of the transmitter coil 412 may result in a short circuit load, in which case the field shielding unit 430 or apparatus may not function as intended.

Furthermore, as the current in the shielding coil 422 is in phase with the current in the transmitter coil 412, the magnetic field strength at the transmitter coil 412 available to couple with a respective receiver coil of a magnetic induction system increases. This is in contrast with shielding or cancellation units or systems in which the current is 180 degrees out of phase. In out of phase systems, there is less magnetic field strength coupled to the receiver coil as a result of the shielding cancellation units or systems. This reduces power transfer efficiency. In contrast, the shielding coil 422 with in phase current improves the power transfer efficiency.

The capacitance of the capacitor 428 is selected such that the impedance or reactance of the transmitter coil 412 and the field shielding unit 430 or apparatus is the same as the impedance or reactance of the transmitter coil 412 without the field shielding unit 430. In particular, the field shielding coil 422 and the capacitor 428 produce a net positive reactance while the conductive plate 426 produces a negative reactance. The capacitance of the capacitor 428 is selected such that the net positive reactance is equal to the negative reactance. As such, there is a net zero reactance, and no change to the impedance or reactance of the transmitter coil 412 with and without the field shielding unit 430. As will be described, the capacitance of the capacitor 428 is selected according to the equation described below. In particular, the capacitance of the capacitor 428 is selected based on equation (7) as will be described.

During operation, the field shielding unit 430 is positioned on the side of the transmitter coil 412 opposite the receiver coil. In the embodiment, the transmitter coil 412 is exactly the same as the transmitter coil 212, unless otherwise stated. The field shielding coil 422 strengthens the magnetic field originating from or generated by the transmitter coil 412 towards the receiver coil, and the conductive plate 426, positioned on the side of the field shielding coil 422 opposite the transmitter coil 412, attenuates residual magnetic field originating from or generated by the transmitter coil 412 towards the conductive plate 426 or away from the receiver coil. As will be appreciated, use of the field shielding coil 422 without the conductive plate 426 would strengthen the magnetic field; however, the field shielding coil 422 would also increase the impedance of the transmitter coil 412. Furthermore, use of the conductive plate 426 without the field shielding coil 422 would attenuate magnetic field; however, the conductive plate 426 would also reduce the impedance of the transmitter coil 412. Use of the field shielding coil 422 and the conductive plate 426 ensures the impedance of the transmitter coil 412 remains generally constant. The tuning and positioning of the field shielding coil 422, and the conductive plate 426, is configured such that the total impedance of the transmitter coil 412 remains unchanged with or without the field shielding unit 430. The capacitance of the capacitor 428 of the field shielding unit 430 is selected such that the impedance of the transmitter coil 412 remains unchanged.

A mathematical model of the field shielding unit 430 can be described from the impedance seen by the transmitter coil 412. The impedance ($Z_{TX}$) seen by the transmitter coil 412 without any field shielding coil 422 or a receiver coil (not shown) present is given by equation 1:

$$Z_{TX} = r_{L_1} + j\omega L_1 \quad (1)$$

where $r_{L_1}$ is the equivalent series resistance (ESR) of the transmitter coil 412 and $\omega L_1$ is the reactance of the transmitter coil 412, where $\omega$ is the operating frequency (radians/sec)), and $L_1$ is the inductance of the transmitter coil.

As previously described, impedance ($Z_{TX}$) as seen by an inverter circuit (e.g. DC/AC inverter 210 as described in reference to wireless power transfer system 200) connected to the transmitter coil 412 will remain the same value before and after adding the field shielding unit 430, or with and without the field shielding unit 430. Maintaining the same impedance value with and without the presence of the field shielding unit 430 ensures the inverter circuit (e.g. DC/Ac inverter 210) does not need to be retuned when the field shielding unit 430 is added or removed, which is highly beneficial over field cancellation systems that require inverter retuning after adding or removing field cancellation coils.

When the field shielding unit 430 is added to the wireless power transfer system 200, the impedance as seen by the transmitter coil 412 is given by equation 2:

$$Z_{TX} = r_{L_1} + j\omega L_1 + Z_{ref2} + Z_{gnd} \quad (2)$$

where $Z_{ref2}$ is the reflected impedance of the single field shielding coil 422 having an inductance $L_2$ with the capacitor C and $Z_{gnd}$ is the reflected impedance of the conductive plate 426 to the field shielding coil 422.

To ensure the impedance ($Z_{TX}$) of the transmitter coil 412 does not change when the field shielding unit 430 is added to a wireless power transfer system, $Z_{ref2}$ plus $Z_{gnd}$ must equal zero as shown in equation 3:

$$Z_{ref2} + Z_{gnd} = 0 \quad (3)$$

Figure 4B:
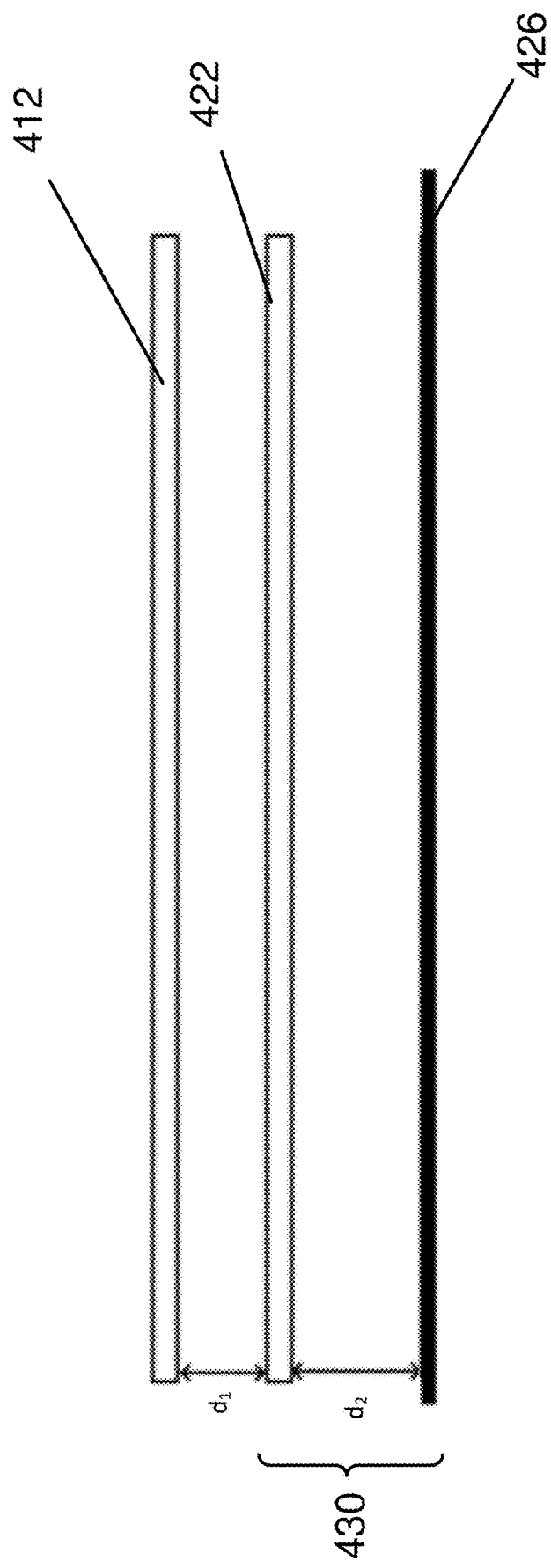
FIG. 4B is an end-view of a shielding unit and transmitter coil in accordance with an aspect of the disclosure.
Figure 4C:
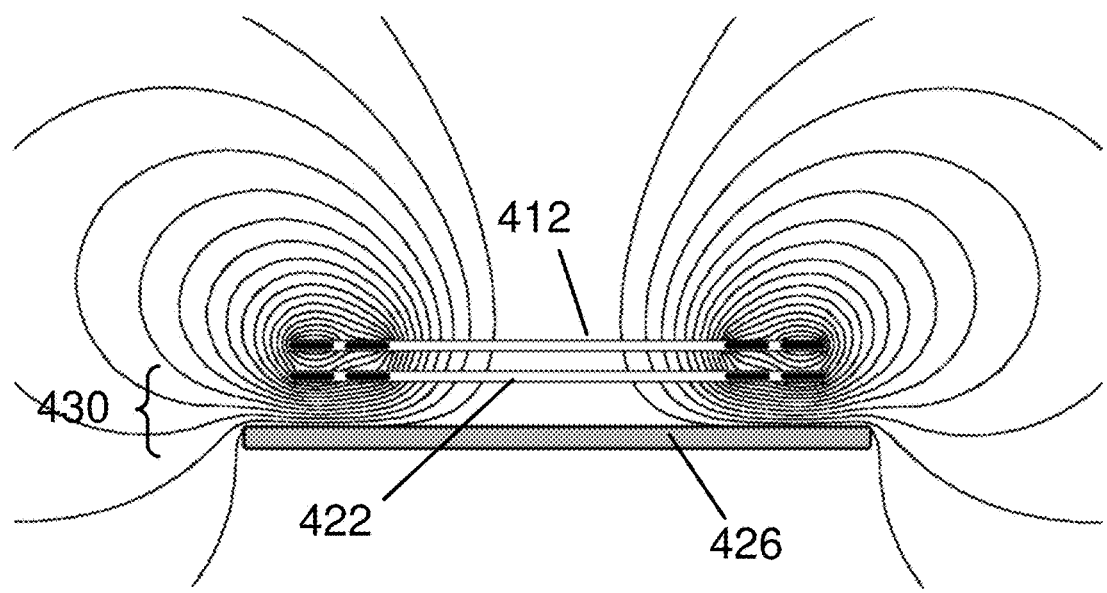
FIG. 4C is an FEM simulation of a magnetic field plot with a shielding unit and transmitter coil configuration in accordance with an aspect of the disclosure.
Figure 4D:
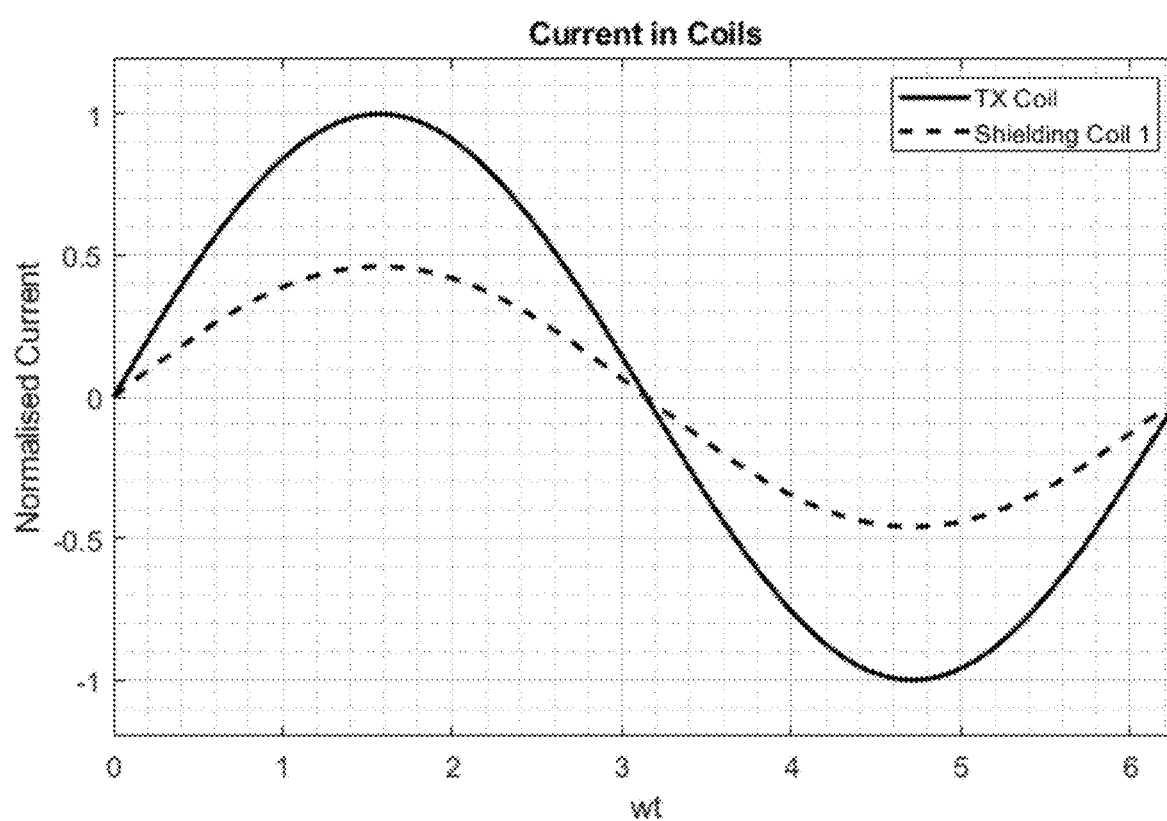
FIG. 4D is a graph of current waveforms in a shielding unit and transmitter coil in accordance with as aspect of the disclosure.
Figure 4E:
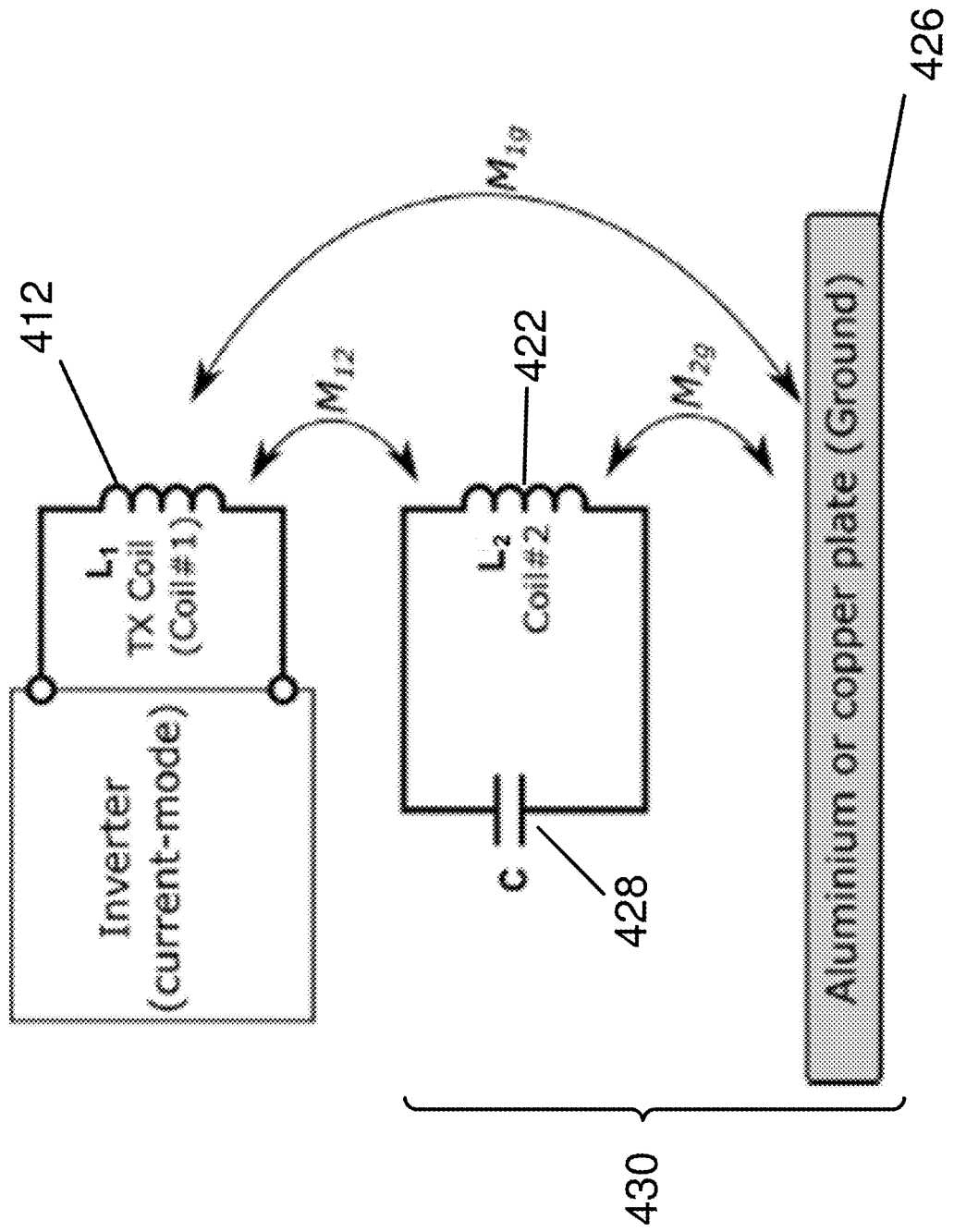
FIG. 4E is an equivalent circuit of a shielding unit and transmitter coil in accordance with an aspect of the disclosure.

The above equation can be expanded based on the relationship between reflected impedance of a coil and impedance of the coil based on the known relationship between reflected impedance and impedance as follows in equation 4:

$$\frac{\omega^2 M_{12}^2}{r_{L_2} + j\omega L_2 + \frac{1}{j\omega C} + Z_{2gnd}} + Z_{1gnd} = 0 \quad (4)$$

where $M_{xx}$ is the mutual inductances between the transmitter coil 412 and the field shielding coil 422 and the conductive plane (as indicated in FIG. 4E), and $Z_{2gnd}$ is the reflected impedance the equivalent AC resistance and inductance of the conductive plate 426.

It should be noted that resistance and inductance of the ground plane are dependent on the mutual inductances, the position and dimensions of the transmitter coil 412 and the field shielding coil 422. From an electromagnetic perspective, the conductive plate 426 acts as a mirror to reflect the impedance of the conductive plate 426. The reflected impedance of the conductive plate 426 is always capacitive, therefore, the second term in equation (4) is negative. Therefore, in this embodiment, the first term of equation (4) should be inductive to satisfy equation (4). The value of C is now applied to create an inductive reflected impedance. Therefore, it can further be concluded that the value of C is such that the reflected impedance $Z_{ref2}$ from the single field shielding coil 422 is positive. The reflected impedance from the field shielding coil 422 is inductive to cancel the negative reflected impedance of the conductive plate 426, meaning that the resonant frequency of the field shielding coil 422 must be higher than the operating frequency of the transmitter 412 of the wireless power transfer system 200.

Thus, the capacitance of the capacitor 428 is selected according to equation (7) for given parameters of a particular wireless power transfer system.

The unintended effect of implementing the field shielding unit 430 is that the field shielding coil 422 will also create a small amount of attenuation of the magnetic field in the direction towards a receiver coil of a receiver. The attenuation of the magnetic field toward the receiver coil of the receiver is due to the field shielding unit 430 creating an asymmetric field. Asymmetric fields typically reduce the strength of the magnetic field compared to the strength of the magnetic field without shielding. The result of attenuation of the magnetic field towards the receiver coil results in an efficiency penalty due to currents flowing in the single field shielding coil 422. The efficiency penalty is in the range of 1% to 5% reduction in efficiency of power transfer from transmitter coil 412 to a receiver coil. This efficiency penalty is insignificant compared with the efficiency penalty found with the use of cancellation or shielding units or systems that are 180 degrees out of phase.

The field shielding unit placement will now be described. Turning now to FIG. 4B, the field shielding coil 422 is positioned at a fixed distance on the side of the transmitter coil 412 opposite the receiver coil. The separation distance between the field shielding coil 422 and the transmitter 412 is uniform across the transmitter and receiver coils 412 and 422. In this embodiment, the distance ($d_1$) between the transmitter coil 412 and the field shielding coil 422 is 12 mm. The conductive plate 426 is placed at a fixed distance from the field shielding coil 422. In this embodiment, the distance ($d_2$) between the field shielding coil 422 and the conductive plate 426 is 22 mm. In this embodiment, the field shielding coil 422 consists of two turns, a 15 mm track width, a 6.5 mm track spacing, a 65 mm inner coil radius and 102.5 mm outer coil radius. The conductive plate 426 may be comprised of any conductive material, including, for example, copper, aluminum, steel. In this embodiment, the conductive plate 426 is comprised of copper tape. While a particular field shielding coil configuration has been described, one of ordinary skill in the art will recognize that the field shielding coil configurations need not be the same as the transmitter coil configuration and, as such, the coils may differ in size, shape, number of turns, track width, track spacing, and may also have different inner and outer radii than described here.

FEM simulations have been performed to verify the principle of operation of the field shielding unit 430. In this embodiment, the simulations are based on a transmitter coil 412 consisting of two turns, a 15 mm track width, a 6.5 mm track spacing, a 65 mm inner coil radius and 102.5 mm outer coil radius. In this embodiment, the current in the transmitter coil 412 is 1 A and the frequency of operation of the transmitter coil 412 is 13.56 MHz.

One of skill in the art will recognize that a transmitter coil 412 with a greater or lesser number of turns, a different track width, a different track spacing, different inner coil radius or different outer coil radius may be used. One of skill in the art will also recognize that the transmitter coil 412 may have a different current or frequency of operation other than is noted in the embodiment described for the purposes of these simulations.

Turning now to FIG. 4C and FIG. 4D, FEM simulations of a transmitter coil 412 with a field shielding unit 430 or apparatus positioned on the side of the transmitter coil 412 opposite the receiver coil are shown. In this embodiment, the field shielding unit 430 comprises a single field shielding coil 422 with an external/discrete capacitor 428 connected across the terminals of the transmitter coil 412, and a conductive plate 426. The dimensions of the conductive plate are generally between 10% and 25% larger in diameter than the outer radius of the transmitter and shielding coil diameter. In this embodiment the conductive plate is comprised of copper and has approximate dimensions of 240 mm by 240 mm.

For the purposes of this particular simulation, the distance ($d_1$) between the transmitter coil 412 and the first field shielding coil 422 is 12 mm. The distance ($d_2$) between the field shielding coil 422 and the conductive plate 426 is 22 mm. Referring to equation (4) the value (C) of the capacitor 428 is 93 pF. FIG. 4D shows that with the field shielding unit 430 positioned on the side of the transmitter coil 412 opposite the receiver coil, the magnetic field emitted from the transmitter coil 412 is now in one direction only and is blocked from emitting from the other side of the transmitter coil 412 by the field shielding unit 430. The ratio of the distance ($d_1$) divided by the outer radius of the transmitter coil 412 yields a ratio of approximately 11.7% for this single-coil field shielding unit 430 configuration. This ratio can be used to generally determine the distance of the field shielding coil 422 from the transmitter coil 412, based on the size of the transmitter coil 412. Similarly, the ratio of the distance ($d_2$) divided by the outer radius of the transmitter coil 412 yields a ratio of approximately 21.5% for this single-coil field shielding unit 430 configuration. This ratio can be used to generally determine the distance of the conductive plate 426 from the single field shielding coil 422, based on the size of the transmitter coil 412.

As FIG. 4C shows the magnetic field emits in both directions from the transmitter coil top and bottom. With the field shielding unit 430 positioned as shown, the majority of the magnetic field is attenuated by the field shielding coil 422 with the remaining magnetic field terminating on the conductive plate 426. Using the field shielding unit 430, the magnetic field is confined to the area around the transmitter coil 412 in front of the field shielding unit 430, thus preventing the magnetic field from radiating around the transmitter coil 412 in multiple directions. The transfer of power via the magnetic field is made safer as the magnetic field is confined to propagate in the intended direction towards the receiver.

FIG. 4D shows the current waveforms in the transmitter coil 412 and field shielding coil 422. The currents are normalized to the current in the transmitter coil 412. The current in the field shielding coil 422 is in phase with the current in the transmitter coil 412. Residual magnetic field originating from the transmitter coil 412 are terminated on the conductive plate 426. As clearly illustrated in FIG. 4D, the normalized current in the field shielding coil 422 is always less than the normalized current in the transmitter coil 412. The current in the field shielding coil 422 increases the magnetic field generated by the transmitter coil 412 thereby increasing wireless power transfer and/or wireless power transfer efficiency.

FIG. 4E shows an equivalent circuit of the field shielding unit in accordance with one aspect of the disclosure. The field shielding unit comprising a field shielding coil 422, a capacitor 428 and a conductive plate 426. $L_1$ represents the inductance of the transmitter coil 412 or the receiver coil (not shown). $L_2$ represents the inductance of the single field shielding coil 422 and C is the capacitance of the single capacitor 428 connected across the terminals of the field shielding coil 422. The field shielding coil 422 is positioned on the side of the transmitter coil 412 opposite the receiver coil at a fixed distance. The conductive plate 426 is positioned on the side of the field shielding coil 422 opposite the transmitter coil 412 at a fixed distance. The mutual inductances between the transmitter coil 412, the field shielding coil 422 and the conductive plate 426 are shown in FIG. 4E.

The transmitter coil 412 may form part of the described wireless power transfer system 200. The wireless power transfer system 200 may include the inverter 210. The inverter 210 may be configured for current-mode output (constant current output) as described in U.S. patent application Ser. No. 17/018,328, the relevant portions of which are incorporated herein by reference.

Although an apparatus 430 with one field shielding coil 422 has been described, one of skill in the art will recognize that other embodiments of the field shielding unit 430 with more than one field shielding coil 422 are also possible. For example, in another embodiment, the field shielding unit comprises two field shielding coils. While adding a second field shielding coil to the field shielding unit may increase the overall size (i.e. thickness) of the field shielding unit, the added benefit is a more efficient field shielding unit, with a thinner, lighter conductive plate, which in turn decreases the weight of the field shielding unit, and by extension, the magnetic inductive system with which the field shielding unit is implemented. Decreasing the thickness of the conductive plate also decreases the thickness of the fielding shielding unit by an equal amount.

Figure 5A:
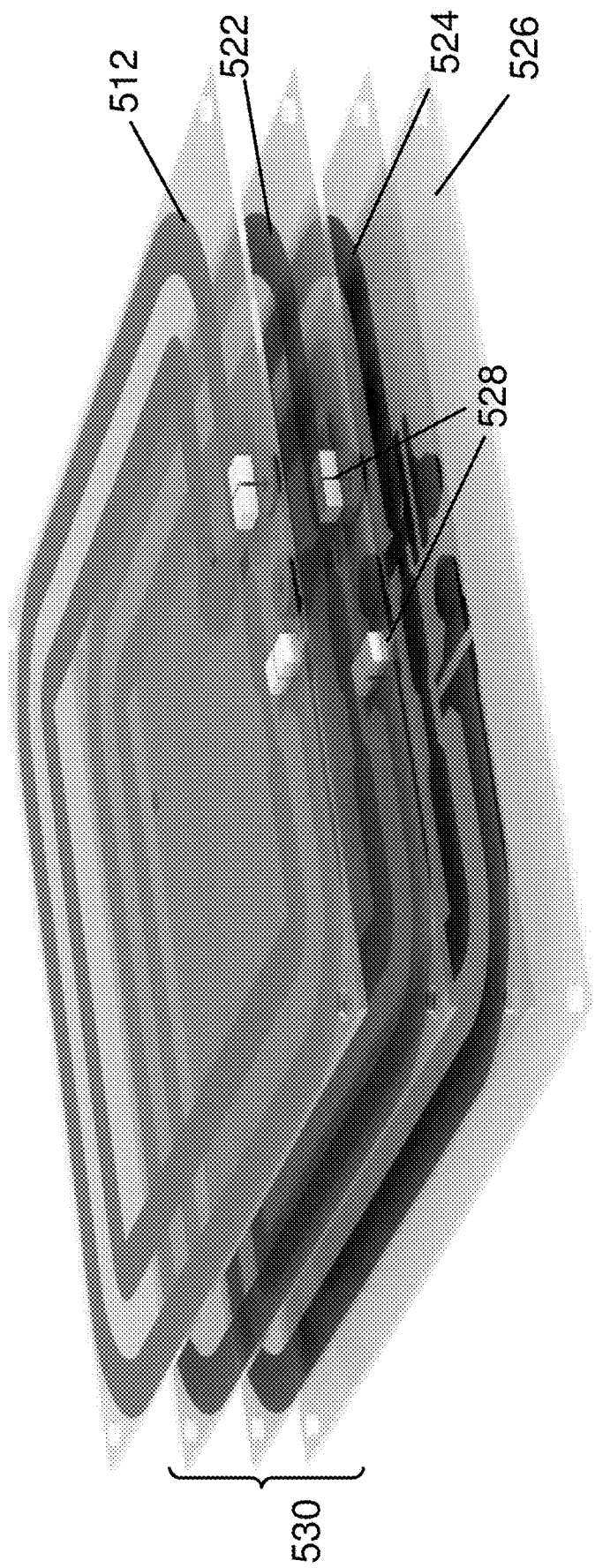
FIG. 5A is a perspective view of another shielding unit and transmitter coil in accordance with an aspect of the disclosure.

Turning now to FIG. 5A, a transmitter coil 512 with a field shielding unit 530 in accordance with one aspect of the disclosure is shown. The transmitter coil 512 is exactly the same as the transmitter coil 412, unless otherwise stated. In this embodiment, the field shielding unit 530 comprises a first field shielding coil 522, a second field shielding coil 524 and a conductive plate 526. The two terminals of the first field shielding coil 522 are electrically connected to a capacitor 528. The capacitor 528 is external to the first field shielding coil 522. The second field shielding coil 524 has an electrical short directly across its terminals. The shorting together of the terminals of the second field shielding coil 524 ensures that the reflected impedance of the second shielding coil 524 is capacitive.

The field shielding coils 522 and 524 are configured to increase the magnetic field generated by the transmitter coil 512. The conductive plate 526 is configured to at least partially attenuate or block the magnetic field generated by the transmitter coil 512 in a direction generally opposite a receiver coil relative to the transmitter coil 512. The conductive plate 526 or conductor is sized and positioned to encompass the first and second field shielding coils 522 and 524. The first field shielding coil 522 and the second field shielding coil 524 are tuned to a different frequency than the frequency of operation of transmitter coil 512 of the wireless power transfer system 200. The field shielding coils 522 and 524 are not tuned to the same frequency as the transmitter coil 512. Tuning the field shielding coils 522 and 524 to the frequency of the transmitter coil 512 may result in a short circuit load, in which case the field shielding unit 530 may not function as intended. The first and second field shielding coils 522 and 524, respectively, may be tuned to different frequencies. Each respective frequency may not be equal to the operating frequency of the transmitter coil 512. Tuning the first and second field shielding coils 522 and 524, respectively, to different frequencies can allow for increased flexibility in voltages and currents flowing in the field shielding coils 522 and 524. In this embodiment, the first field shielding coil 522 and second field shielding coil 524 are tuned to a frequency that is higher than the frequency of operation of the transmitter coil 512.

The first field shielding coil 522 is placed at a fixed distance from the transmitter coil 512. The second field shielding coil 524 is placed at a fixed distance from the first field shielding coil 524. In this embodiment, the distance between the first field shielding coil 522 and the second field shielding coil 524 is 15 mm. The conductive plate 526 is placed at a fixed distance from the second field shielding coil 524.

The field shielding unit or apparatus 530 is positioned such that a plane formed by the first field shielding coil 512 is parallel with a plane formed by the transmitter coil 512. The plane formed by the first field shielding coil 512 is also parallel with a plane formed by the second field shielding coil 524. The plane formed by the second field shielding coil 524 is parallel with a plane formed by the conductive plate 526. Thus, the planes formed by the transmitter and first and second field shielding coils 512, 522, 524 and the conductive plate 526 are all parallel. The plane of any one of the transmitter and first and second field shielding coils 512, 522, 524 and conductive plate 526 may be defined as a major object plane of the particular element.

The first field shielding coil 522 is adjacent one side of the transmitter coil 512 while a receiver coil is adjacent the other, opposite side of the transmitter coil 512. The transmitter coil 512 is adjacent one side of the first field shielding coil 522, and the second field shielding coil 524 is adjacent the other, opposite side of the first shielding coil 522. The first field shielding coil 522 is adjacent one side of the second field shielding coil 524, and the conductive plate 526 is adjacent the other, opposite side of the second field shielding coil 524.

In this embodiment, the distance ($d_3$) between the second field shielding coil 524 and the conductive plate 526 is 7 mm. The conductive plate 526 may be comprised of any conductive material, including, for example, copper, aluminum, steel. In this embodiment, the conductive plate 526 is comprised of copper foil.

The tuning and positioning of the first field shielding coil 522 and the second field shielding coil 524, and the conductive plate 526, is configured so that the total impedance of the transmitter coil 512 remains unchanged with or without the field shielding unit 530.

For example, in one embodiment, the transmitter coil 512 has an inductance of 1 uH with the first field shielding coil 522, the second field shielding coil 524, and the conductive plate 526. When the field shielding unit 530, comprising the first and second field shielding coils, 522 and 524, respectively, and the conductive plate 526, is placed near the transmitter coil 512, the inductance of the transmitter coil 512 will remain at 1 uH. The capacitance of the capacitor 528 is selected such that the inductance of the transmitter coil 512 is unchanged with or without the presence of the field shielding unit 530. Since the inductance is unchanged, the impedance is also unchanged. In other words, the introduction of the field shielding unit 530 does not affect the impedance.

Figure 5B:
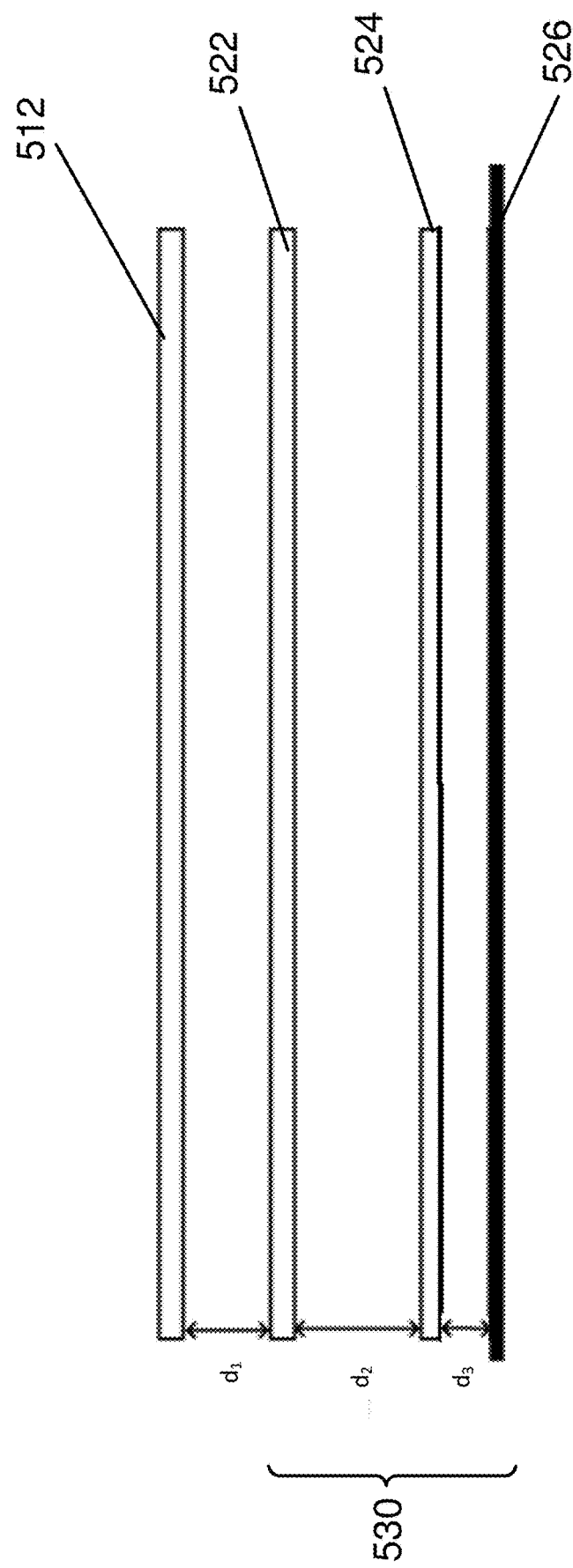
FIG. 5B is an end-view of a shielding unit and transmitter coil in accordance with an aspect of the disclosure.

FIG. 5B shows a more detailed view of an example configuration of the first field shielding coil 522, the second field shielding coil 524, and the conductive plate 526, in relation to the transmitter coil 512. In this embodiment, the field shielding coil 522 is placed 12 mm from the transmitter coil 512. The field shielding coil 522 is electrically connected to the capacitor 528. The capacitor 528 is connected across the terminals of the first field shielding coil 522. The capacitor 528 has a capacitance of 132 pF. In this embodiment, the second field shielding coil 524 is placed 15 mm from the first field shielding coil 522. The terminals of the second field shielding coil 524 are electrically shorted together to create a capacitive reflected impedance. In this embodiment, the conductive plate 526 is placed at a fixed distance from the second field shielding coil 524, respectively. In this embodiment, the fixed distance between the second field shielding coils 524 and the conductive plate is 7 mm.

Figure 5C:
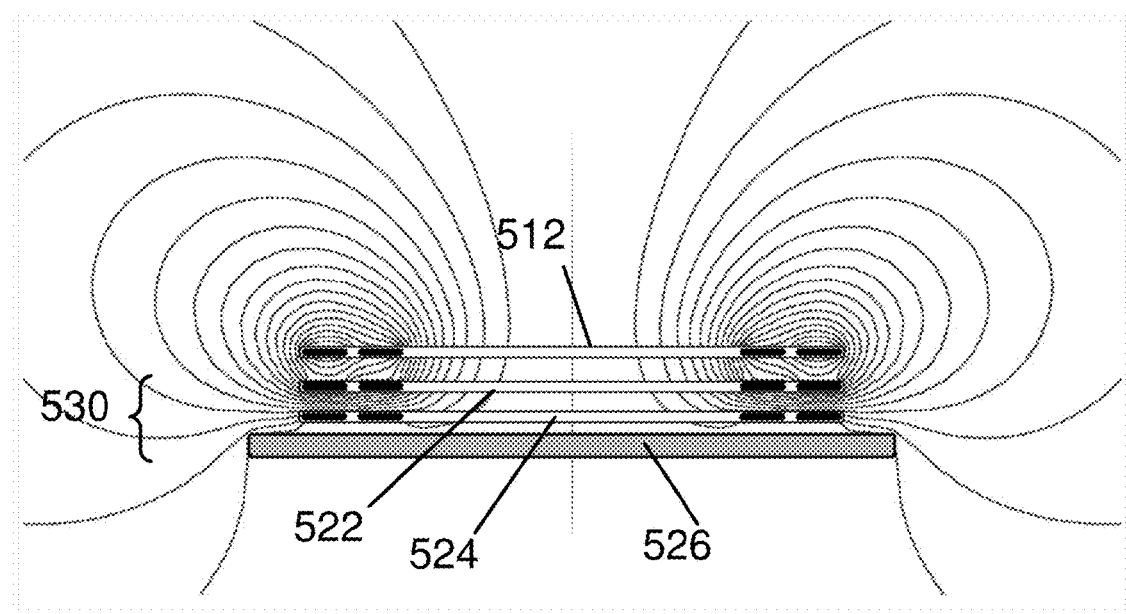
FIG. 5C is an FEM simulation of a magnetic field plot with a shielding unit and transmitter coil configuration in accordance with an aspect of the disclosure.
Figure 5D:
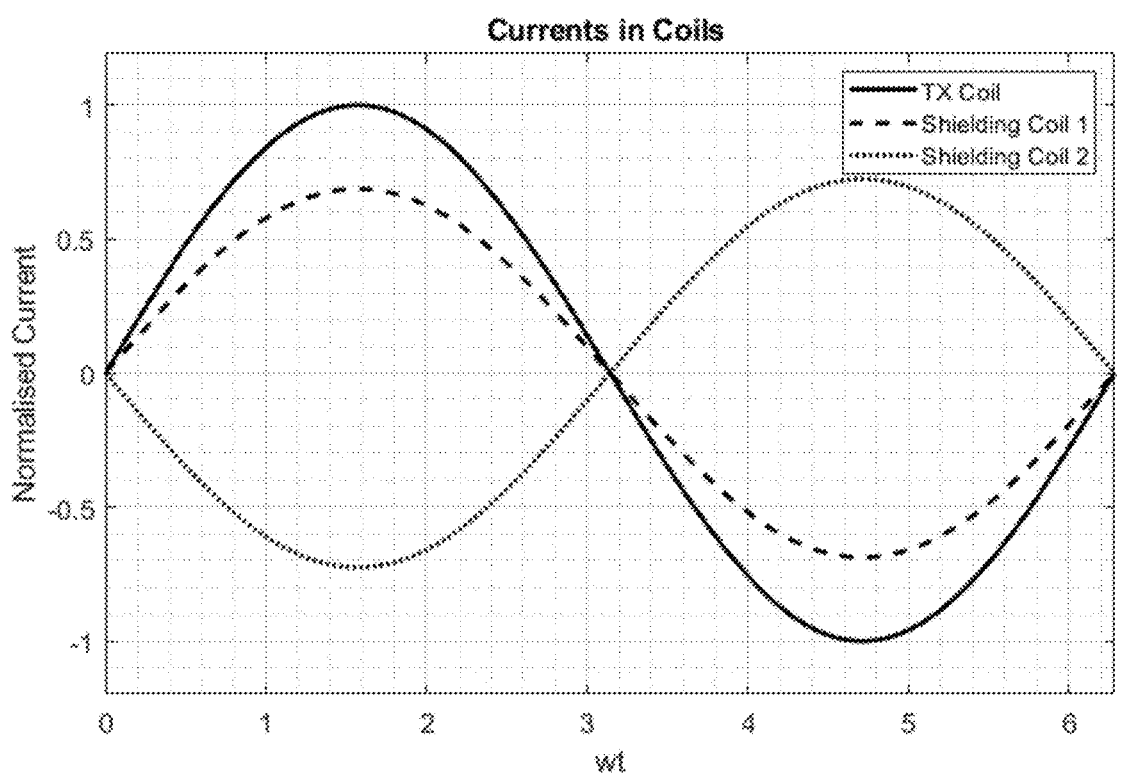
FIG. 5D is a graph of current waveforms in a shielding unit and transmitter coil in accordance with as aspect of the disclosure.

Turning now to FIG. 5C and FIG. 5D, FEM simulations of a transmitter coil 512 with a field shielding unit 530 positioned on the side of the transmitter coil 512 opposite the receiver coil are shown. In this embodiment, the field shielding unit 530 comprises a first field shielding coil 522 with an external/discrete capacitor 528 connected across the terminals of the first field shielding coil 522, a second field shielding coil 524 with the two terminals of the second field shielding coil electrically shorted together to create a capacitive reflected impedance, and a conductive plate 526. The conductive plate 526 is exactly the same as the conductive plate 426 unless otherwise stated.

For the purposes of these particular simulations, the distance ($d_1$) between the transmitter coil 512 and the first field shielding coil 522 is 12 mm. The distance ($d_2$) between the first field shielding coil 522 and the second field shielding coil 524 is 15 mm. The distance ($d_3$) between the second field shielding coil 524 and the conductive plate 526 is 7 mm. Referring to equation (7) described below, the value (C) of the capacitor 428 is 132 pF. FIG. 5C shows that with the field shielding unit 530 positioned on the side of the transmitter coil 512 opposite the receiver coil, the magnetic field emitted from the transmitter coil 512 is now in one direction only and is blocked from emitting from the other side of the transmitter coil 512 by the field shielding unit 530. The ratio of the distance ($d_1$) divided by the outer radius of the transmitter coil 512 yields a ratio of approximately 11.7% for this two-coil, single-capacitor field shielding unit 530 configuration. This ratio can be used to generally determine the distance of the first shielding coil 522 from the transmitter coil 512, based on the size of the transmitter coil 512. The ratio of the distance ($d_2$) divided by the outer radius of the transmitter coil 512 yields a ratio of approximately 14.6% for this two-coil, single-capacitor field shielding unit 530 configuration. This ratio can be used to generally determine the distance of the second shielding coil 524 from the first field shielding coil 522, based on the size of the transmitter coil 512. The ratio of the distance ($d_3$) divided by the outer radius of the transmitter coil 512 yields a ratio of approximately 6.83% for this two-coil, single-capacitor field shielding unit 530 configuration. This ratio can be used to generally determine the distance of the conductive plate 526 from second field shielding coil 524, based on the size of the transmitter coil 512. When added together, the ratios of ($d_2$) and ($d_3$) are approximately equal to the distance ($d_2$) in the single-coil field shielding unit 430 configuration. In this embodiment, the field shielding coil consists of two turns, a 15 mm track width, a 6.5 mm track spacing, a 65 mm inner coil radius and 102.5 mm outer coil radius. The conductive plate 526 may be comprised of any conductive material including, for example, copper, aluminum, steel. In this embodiment, the conductive plate 526 is comprised of copper tape. In this embodiment, the field shielding coil consists of two turns, a 15 mm track width, a 6.5 mm track spacing, a 65 mm inner coil radius and 102.5 mm outer coil radius. While a particular field shielding coil configuration has been described, one of ordinary skill in the art will recognize that the field shielding coil configurations need not be the same as the transmitter coil configuration and, as such, the coils may differ in size, shape, number of turns, track width, track spacing, and may also have different inner and outer radii than described here.

FIG. 5C shows the magnetic field plot of the transmitter coil 512 of a wireless power transfer system which in this embodiment is a magnetic induction system as previously described with the field shielding unit 530 of FIG. 5A. The transmitter coil 512 is shown with the magnetic field illustrated by circular lines. As shown, the magnetic field emits in both directions from the coil, top and bottom. With the field shielding unit 530 positioned as shown, the magnetic fields are attenuated by the first field shielding coil 522 and second field shielding coil 524, with any residual magnetic fields terminating on the conductive plate 526. Using the field shielding unit 530, the magnetic field is confined to the area around the transmitter coil 512 in front of the field shielding unit 530, thus preventing the magnetic field from radiating around the transmitter coil 512 in multiple directions. The transfer of power via the magnetic field is made safer as the magnetic field is configured to propagate in the intended direction towards the receiver by using the field shielding unit 530.

FIG. 5D shows the current waveforms in the transmitter coil 512 and first and second shielding coils 522 and 524, respectively. The currents are normalized to the current in the transmitter coil 512. The current in the shielding coils 522 and 524, respectively, is in phase with the current in the transmitter coil 512.

Figure 5E:
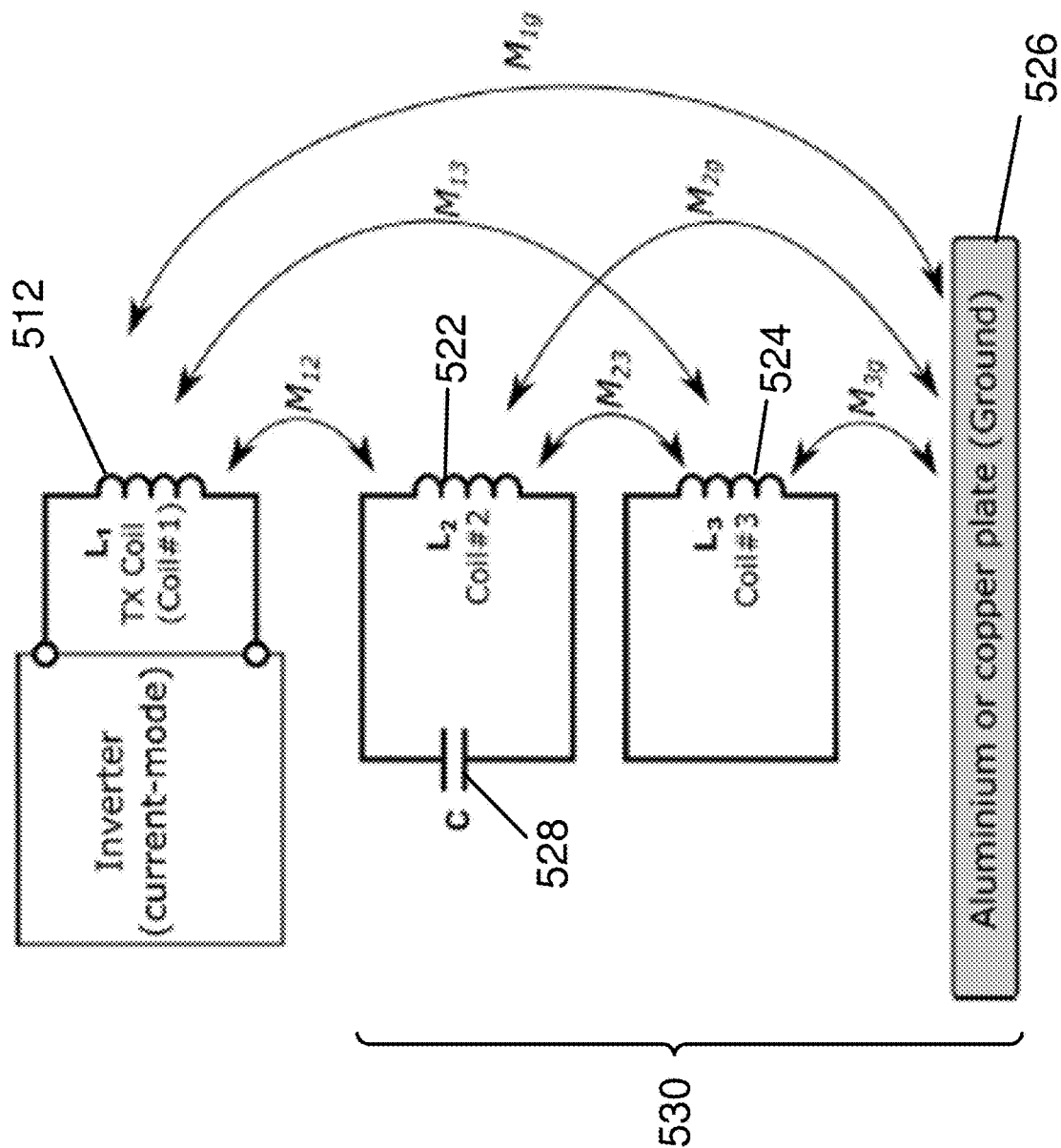
FIG. 5E is an equivalent circuit of a shielding unit and transmitter coil in accordance with an aspect of the disclosure.

FIG. 5E shows an equivalent circuit of a field shielding unit 530 configuration comprising two field shielding coils 522 and 524, respectively, and a conductive plate 526. The first field shielding coil 522 has a single discrete/external capacitor 528 that is connected across the terminals of the first field shielding coil 522. The capacitor 528 is used to set the resonant frequency of the first field shielding coil 522. The terminals of the second field shielding coil 524 are shorted together to create a capacitive reflected impedance ($Z_{ref3}$). $L_3$ represents the represents the inductance of the second field shielding coil 524.

The additional advantage of a two-coil field shielding unit 530 configuration over the single-coil field shielding unit 430 configuration is that the conductive plate 526 can now be much thinner, and potentially lighter, than the conductive plate 426 in the single-coil field shielding unit 430. The majority of current not flowing in the conductive plate 526 is now conducted in the second field shielding coil 524, and thus the conductive plate 426 may be thinner. In addition the total conduction losses are reduced. This means that thin conductive plates such as copper or aluminum foil can be used instead of thick slabs of conductive material. Since the most expensive and heaviest part of the field shielding unit 530 is the conductive plate 526, adding the second field shielding coil 524 allows the conductive plate 526 to be thinner, resulting in less weight for the field shielding unit 530 as compared to the weight of the second coil 524 that is added. Adding the second coil 524 also has the benefit or reducing the cost of the conductive plate 526, and by extension, reduces the cost of the field shielding unit 530.

FIG. 5E shows the equivalent circuit of the field shielding unit 530 with a first field shielding coil 522 and one capacitor 528, and a second field shielding coil 524. The reflected impedance ($Z_{TX}$) as seen from the transmitter coil 512 shown in equation 5:

$$Z_{TX} = r_{TX} + j\omega L_1 + Z_{ref2} + Z_{ref3} + Z_{1gnd} \quad (5)$$

The above equation now includes the reflected impedance $Z_{ref3}$ of the second field shielding coil 524. Similarly, the impedance ($Z_{TX}$) of the transmitter coil 512 before adding the field shielding unit must remain the same when adding the field shielding unit 530 on the side of the transmitter coil 512 opposite the receiver coil, as shown in equation 6:

$$Z_{ref2} + Z_{ref3} + Z_{1gnd} = 0 \quad (6)$$

The above equation can be expanded as follows to equation 7:

$$\frac{\omega^2 M_{12}^2}{r_{L_2} + j\omega L_2 + \frac{1}{j\omega C} + \frac{\omega^2 M_{23}^2}{r_{L_3} + j\omega L_3 + Z_{3gnd}} + Z_{2gnd}} + \quad (7)$$

$$\ldots\ldots \frac{\omega^2 M_{13}^2}{r_{L_3} + j\omega L_3 + \frac{\omega^2 M_{23}^2}{r_{L_2} + j\omega L_2 + \frac{1}{j\omega C} + Z_{2gnd}} + Z_{3gnd}} + Z_{1gnd} = 0$$

The reflected impedance $Z_{ref3}$ of the second field shielding coil 524 is capacitive since its terminals are shorted together to create a capacitive reflected impedance. The reflected impedance of the conductive plate is always capacitive, this means that the second and third terms in equation (7) are negative. Therefore, the first term of the equation is inductive to satisfy the equation (7). The value of C is now critical to create an inductive reflected impedance. Similar to the previous configuration the conclusion is that: The value of C is such that the reflected impedance from the first field shielding coil 522 $Z_{ref2}$ is positive, i.e. inductive, to cancel the negative reflected impedance from the second field shielding coil 524 and the conductive plate 526. This means that the resonant frequency of the first field shielding coil 522 having an inductance $L_2$ must be higher than the operating frequency of the transmitter coil 512 of the wireless power transfer system, which in this embodiment is a magnetic induction system.

The unintended effect of implementing the field shielding unit 530 is that the field shielding coils 522 and 524 will also create a small amount of attenuation of the magnetic field in the direction towards the receiver coil of the receiver. The result of attenuation of the magnetic field towards the receiver coil results in an efficiency penalty due to currents flowing in the first and second field shielding coils 522 and 524, respectively. The efficiency penalty is in the range of 1% to 5% reduction in efficiency of power transfer from transmitter coil 512 to receiver coil. This efficiency penalty is insignificant compared with the efficiency penalty found with the use of cancellation or shielding units or systems that are 180 degrees out of phase.

As with FIG. 4E, the transmitter coil 512 depicted in FIG. 5E may form part of the described wireless power transfer system 200. The wireless power transfer system 200 may include the inverter 210. The inverter 210 may be configured for current-mode output (constant current output) as described in above-incorporated U.S. patent application Ser. No. 17/018,328.

Figure 6A:
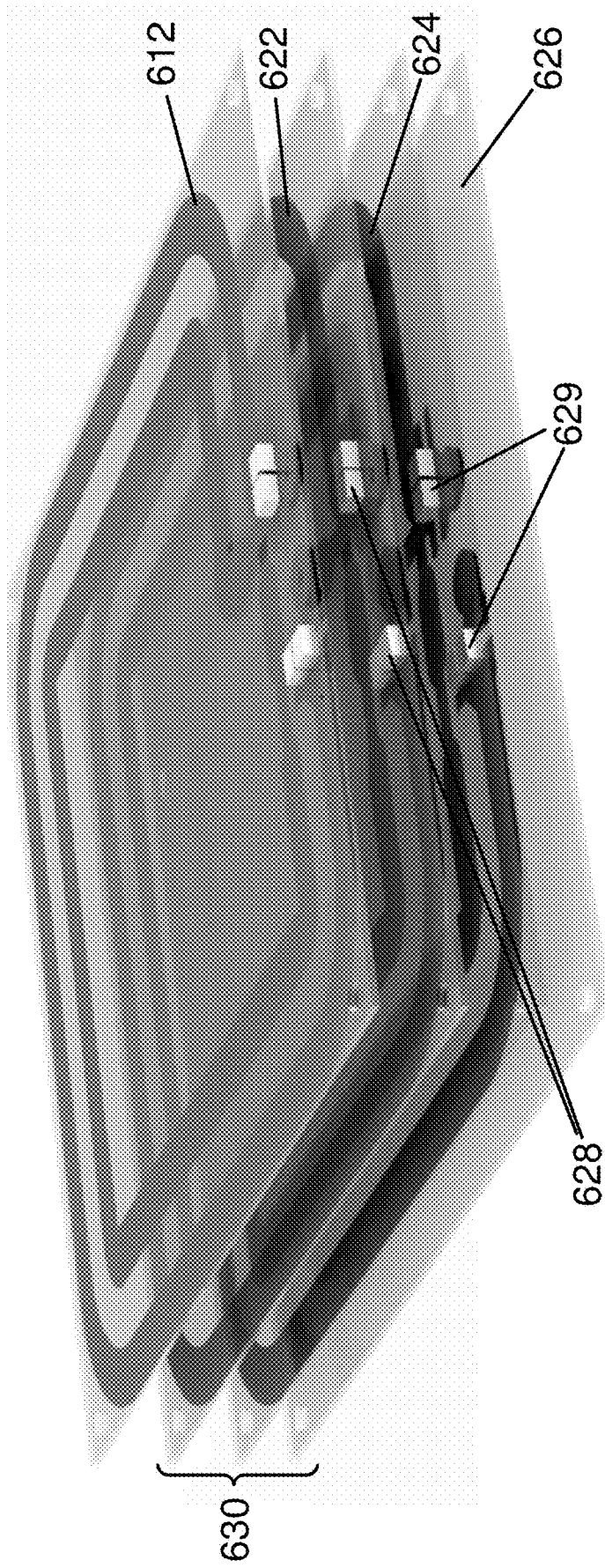
FIG. 6A is a perspective view of another shielding unit and transmitter coil in accordance with an aspect of the disclosure.

FIG. 6A shows a transmitter coil 612 with a field shielding unit 630 in accordance with one aspect of the disclosure. The transmitter coil 612 is exactly the same as the transmitter coil 512, unless otherwise stated. In this embodiment, the field shielding unit 630 comprises a first field shielding coil 622, a second field shielding coil 624, and a conductive plate 626. The first and second field shielding coils 622 and 624, respectively, are tuned to a different frequency than the operation frequency of the transmitter coil 612 of the wireless power transfer system 200. The first and second field shielding coils 622 and 624 are not tuned to the same frequency as the transmitter coil 612. Tuning the first and second field shielding coils 622 and 624 to the frequency of the transmitter coil 612 may result in a short circuit load, in which case the field shielding unit 630 may not function as intended. In this embodiment, the first field shielding coil 622 and the second field shielding coil 624 are tuned to a frequency that is higher than the frequency of operation of the transmitter coil 612. The conductive plate 626 may be comprised of any conductive material, including, for example, copper, aluminum, or steel. In this embodiment, the conductive plate 626 is comprised of copper foil.

The first shielding coil 622 is positioned at a fixed distance on the side of the transmitter coil 612 opposite the receiver coil. The second field shielding coil 624 is positioned at fixed distances on the side of the first field shielding coil 622 opposite the transmitter coil 612. The conductive plate 626 is placed on the side of the first and second field shielding coils 622 and 624, respectively, opposite the transmitter coil 612, to completely attenuate or block any residual magnetic field not already cancelled by the first and second shielding coils 622 and 624, respectively. The same configuration can be applied to the receiver coil.

The tuning and positioning of the first field shielding coil 622 and the second field shielding coil 624, and the conductive plate 626, is configured so that the total impedance of the transmitter coil 612 remains unchanged with or without the field shielding unit 630.

For example, in one embodiment, the transmitter coil 612 has an inductance of 1 uH with the first field shielding coil 622, the second field shielding coil 624, and the conductive plate 626. When the field shielding unit 630, comprising the first and second field shielding coils 622 and 624, respectively, and the conductive plate 626, is placed near the transmitter coil 612, the inductance of the transmitter coil 612 will remain at 1 uH. Since the inductance is unchanged, the impedance is also unchanged. In other words, the introduction of the field shielding unit 630 does not affect the impedance.

The first field shielding coil 622 has a discrete/external capacitor 628 connected across its terminals, and the second field shielding coil 624 has a discrete/external capacitor 629 connected across its terminals. The main purpose of capacitors 628 and 629 is to set the impedance and the resonant frequency of the first field shielding coil 622 and the second field shielding coil 624, respectively. The difference between this configuration using capacitors 628 and 629 electrically connected across the terminals of the first field shielding coil 622 and second field shielding coil 624, respectively, and the configurations of the two previous field shielding units, 430 and 530, is that the configuration in FIG. 6A allows for increased control over the impedances that are reflected to the transmitter coil 612, and thus can result in a thinner, more compact, field shielding unit 630, wherein the first and second field shielding coils 622 and 624, and the conductive plate 626 can be positioned closer to the transmitter coil 612, thus decreasing the overall dimensions of the field shielding unit 630, while maintaining performance and reducing weight of the field shielding unit, and thus, the overall system, as compared to traditional field shielding materials, such as ferrite.

Figure 6B:
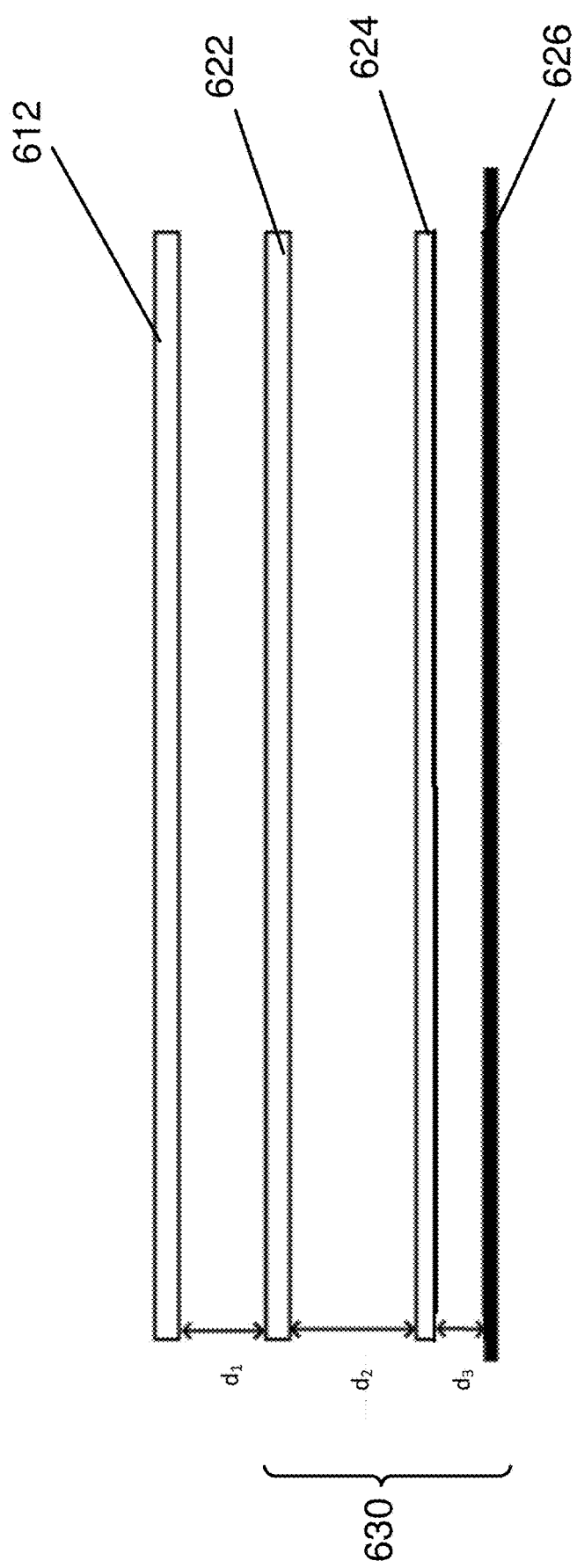
FIG. 6B is an end-view of a shielding unit and transmitter coil in accordance with an aspect of the disclosure.

FIG. 6B shows an end view of an example configuration of the first and second field shielding coils 622 and 624, respectively, and the conductive plate 626, in relation to the transmitter coil 612. In this embodiment, the first field shielding coil 622 is placed 12 mm on the side of the transmitter coil 612 opposite the receiver coil. The first field shielding coil 622 is electrically connected to a first capacitor 628. The first capacitor 628 is connected across the terminals of the first field shielding coil 622. In this embodiment, the first capacitor 628 has a capacitance of 89 pF. In this embodiment, the second field shielding coil 624 is placed 15 mm on the side of the first field shielding coil 622 opposite the transmitter coil 612. The second field shielding coil 624 is electrically connected to a second capacitor 629. The second capacitor 629 is connected across the terminals of the second field shielding coil 624. In this embodiment, the second capacitor 629 has a capacitance of 89 pF. In this embodiment, the conductive plate 626 is placed at a fixed distance of 7 mm on the side of the second field shielding coil 624 opposite the first shielding coil. In this embodiment, each field shielding coil 622 and 624 consists of two turns, a 15 mm track width, a 6.5 mm track spacing, a 65 mm inner coil radius and 102.5 mm outer coil radius. The conductive plate 626 may be comprised of any conductive material including, for example, copper, aluminum, steel. In this embodiment, the conductive plate 626 is comprised of copper tape. While a particular field shielding coil configuration has been described, one of ordinary skill in the art will recognize that the field shielding coil configurations need not be the same as the transmitter coil configuration and, as such, the coils may differ in size, shape, number of turns, track width, track spacing, and may also have different inner and outer radii than described here.

Figure 6C:
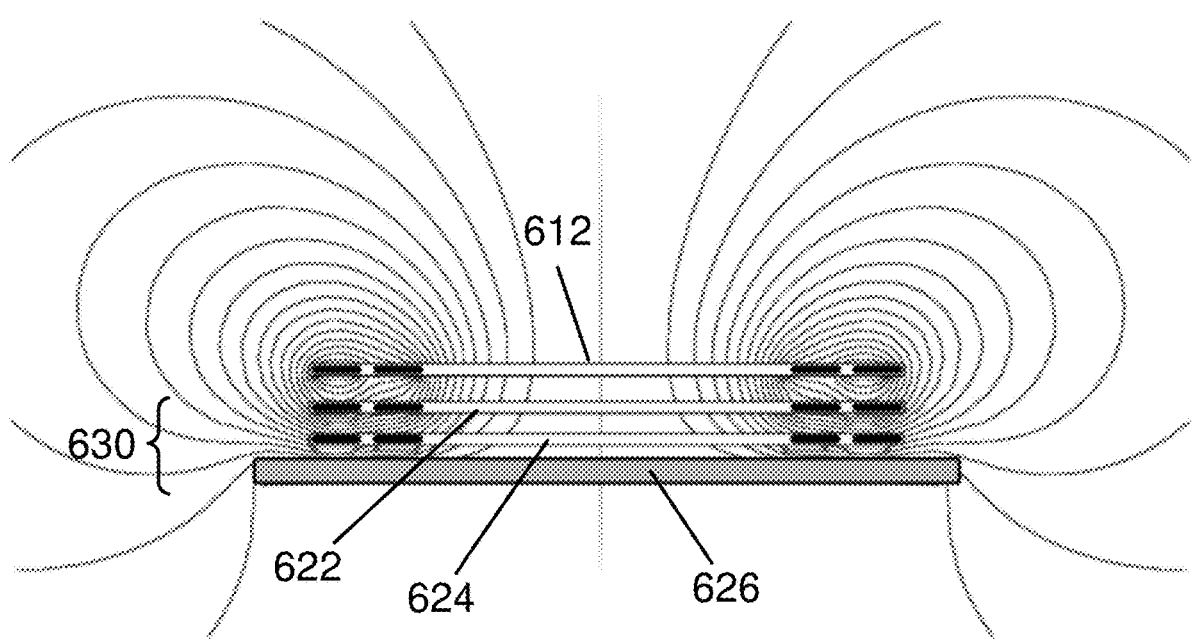
FIG. 6C is an FEM simulation of a magnetic field plot of a shielding unit and transmitter coil in accordance an aspect of the disclosure.
Figure 6D:
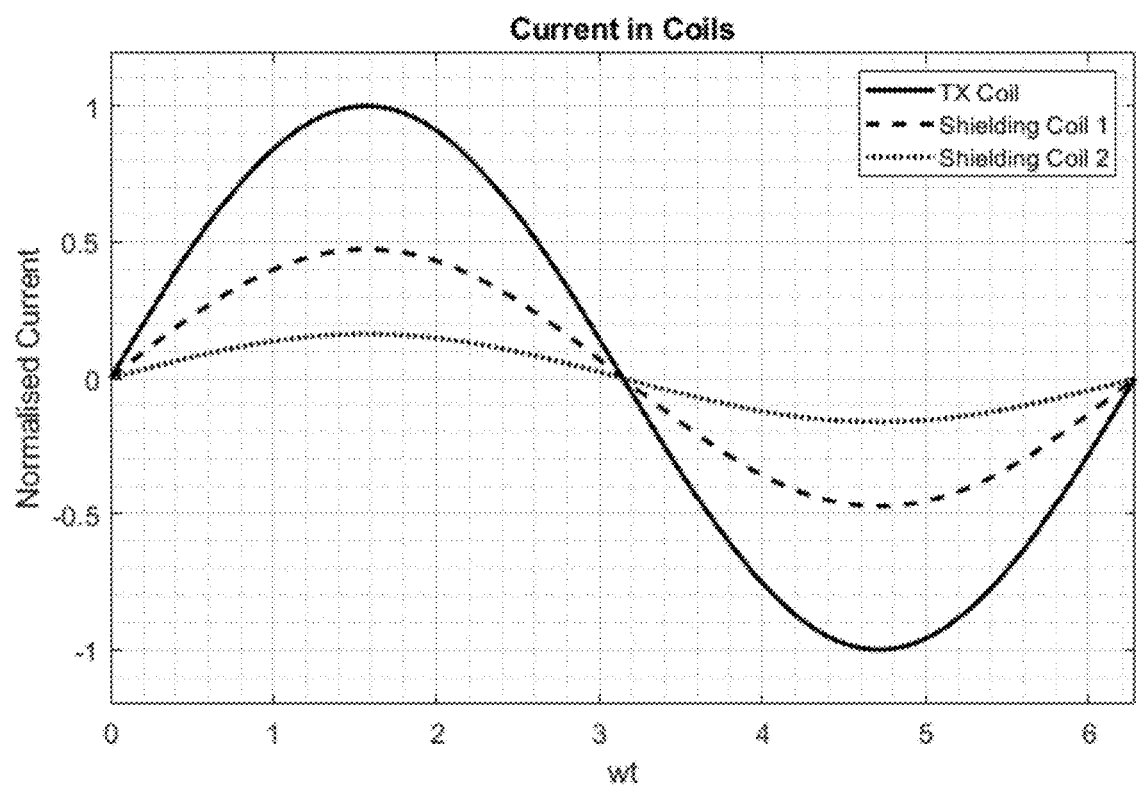
FIG. 6D is a graph of current waveforms in a shielding unit and transmitter coil in accordance with as aspect of the disclosure.

Turning now to FIG. 6C and FIG. 6D, FEM simulations of a transmitter coil 612 with a field shielding unit 630 positioned on the side of the transmitter coil 612 opposite the receiver coil are shown. In this embodiment, the field shielding unit 630 comprises a first field shielding coil 622 with a first discrete/external capacitor 628 connected across the terminals of the first field shielding coil 622, a second field shielding coil 624 with a second discrete/external capacitor 629 connected across the terminals of the second field shielding coil 624, and the conductive plate 626. The conductive plate 626 is exactly the same as the conductive plate 526 unless otherwise stated.

For the purposes of these particular simulations, the distance ($d_1$) between the transmitter coil 612 and the first field shielding coil 622 is 12 mm. The distance ($d_2$) between the first field shielding coil 622 and the second field shielding coil 624 is 15 mm. The distance ($d_3$) between the second field shielding coil 624 and the conductive plate 626 is 7 mm. Referring to equation (10) described below for this embodiment, the value ($C_1$) of the first capacitor 628 is 89 pF.

The ratio of the distance ($d_1$) divided by the outer radius of the transmitter coil 612 yields a ratio of approximately 11.7% for this two-coil, two-capacitor field shielding unit 630 configuration. This ratio can be used to generally determine the distance of the first shielding coil 622 from the transmitter coil 612, based on the size of the transmitter coil 612. The ratio of the distance ($d_2$) divided by the outer radius of the transmitter coil 612 yields a ratio of approximately 14.6% for this two-coil, two-capacitor field shielding unit 630 configuration. This ratio can be used to generally determine the distance of the second shielding coil 624 from the first field shielding coil 622, based on the size of the transmitter coil 612. The ratio of the distance ($d_3$) divided by the outer radius of the transmitter coil 612 yields a ratio of approximately 6.83% for this two-coil, two-capacitor field shielding unit 630 configuration. This ratio can be used to generally determine the distance of the conductive plate 626 from the second field shielding coil 624, based on the size of the transmitter coil 612.

FIG. 6C shows the magnetic field plot of the transmitter coil 612 of a wireless power transfer system which in this embodiment is a magnetic induction system with the field shielding unit 630 of FIG. 6A. The transmitter coil 612 is shown with the magnetic field illustrated by circular lines. As shown, the magnetic field emits in both directions from the coil, top and bottom. With the field shielding unit 630 positioned as shown, the magnetic fields are attenuated by the first field shielding coil 622 and second field shielding coil 624, with any residual magnetic fields terminating on the conductive plate 626. Using the field shielding unit 630, the magnetic field is confined to the area around the transmitter coil 612 in front of the field shielding unit 630, thus preventing the magnetic field from radiating around the transmitter coil 612 in multiple directions. The transfer of power via the magnetic field is made safer as the magnetic field is confined to propagate in the intended direction towards the receiver by using the field shielding unit 530.

FIG. 6D shows the current waveforms in the transmitter coil 612 and first and second shielding coils 622 and 624, respectively. The currents are normalized to the current in the transmitter coil 612. The current in the first and second shielding coils 622 and 624, respectively, is in phase with the current in the transmitter coil 612.

Figure 6E:
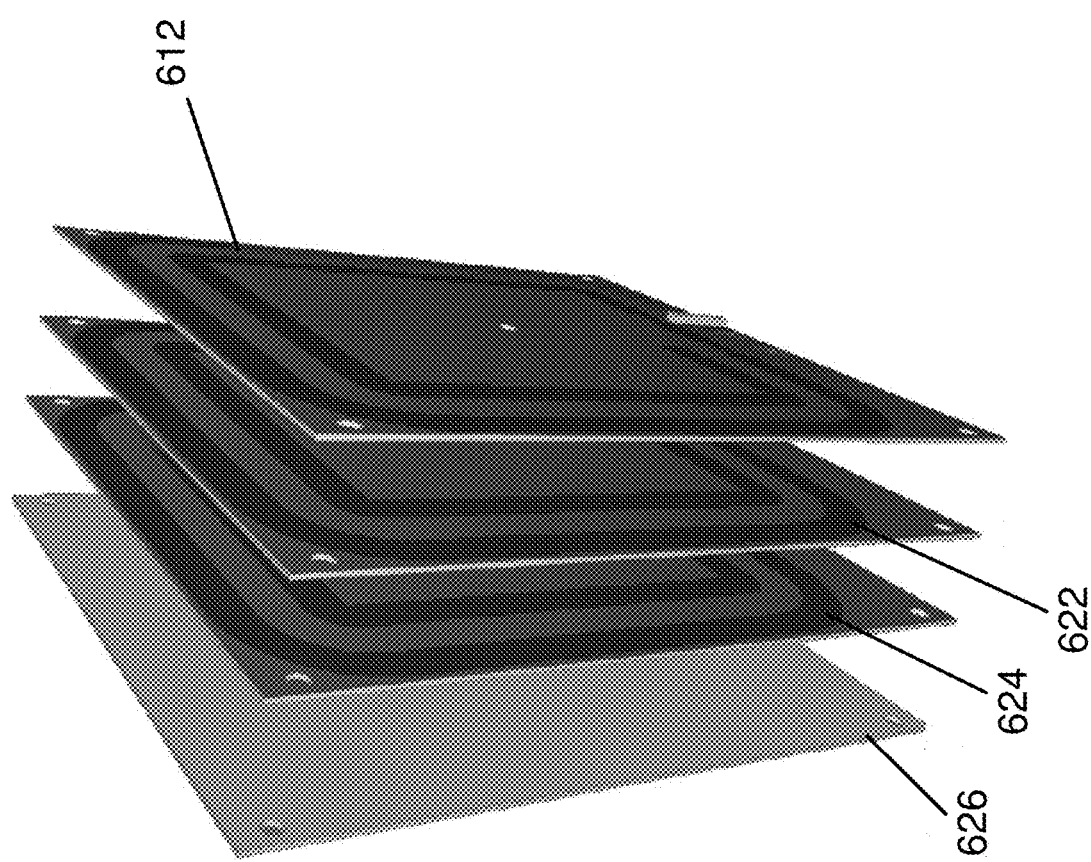
FIG. 6E is an elevated perspective view of a shielding unit and transmitter coil in accordance with another aspect of the disclosure.

FIG. 6E shows an example illustration of a field shielding unit 630 comprised of a first field shielding coil 622, a second field shielding coil 624, and an conductive plate 626, positioned on the side of the transmitter coil 612 opposite the receiver coil. In this embodiment, the coils are printed circuit board (PCB) coils. While a specific embodiment of a field shielding unit 630 positioned on the side of the transmitter coil 612 opposite the receiver coil has been described, one of reasonable skill in the art will recognize that the same figure could also describe a field shielding unit 630 placed on the side of the receiver coil opposite the transmitter coil 612 of a wireless power transfer system which in this embodiment is a magnetic induction system.

As with FIG. 4E, the transmitter coil 612 depicted in FIG. 6E may form part of the described wireless power transfer system 200. The wireless power transfer system 200 may include the inverter 210. The inverter 210 may be configured for current-mode output (constant current output) as described in above-incorporated U.S. patent application Ser. No. 17/018,328.

Figure 6F:
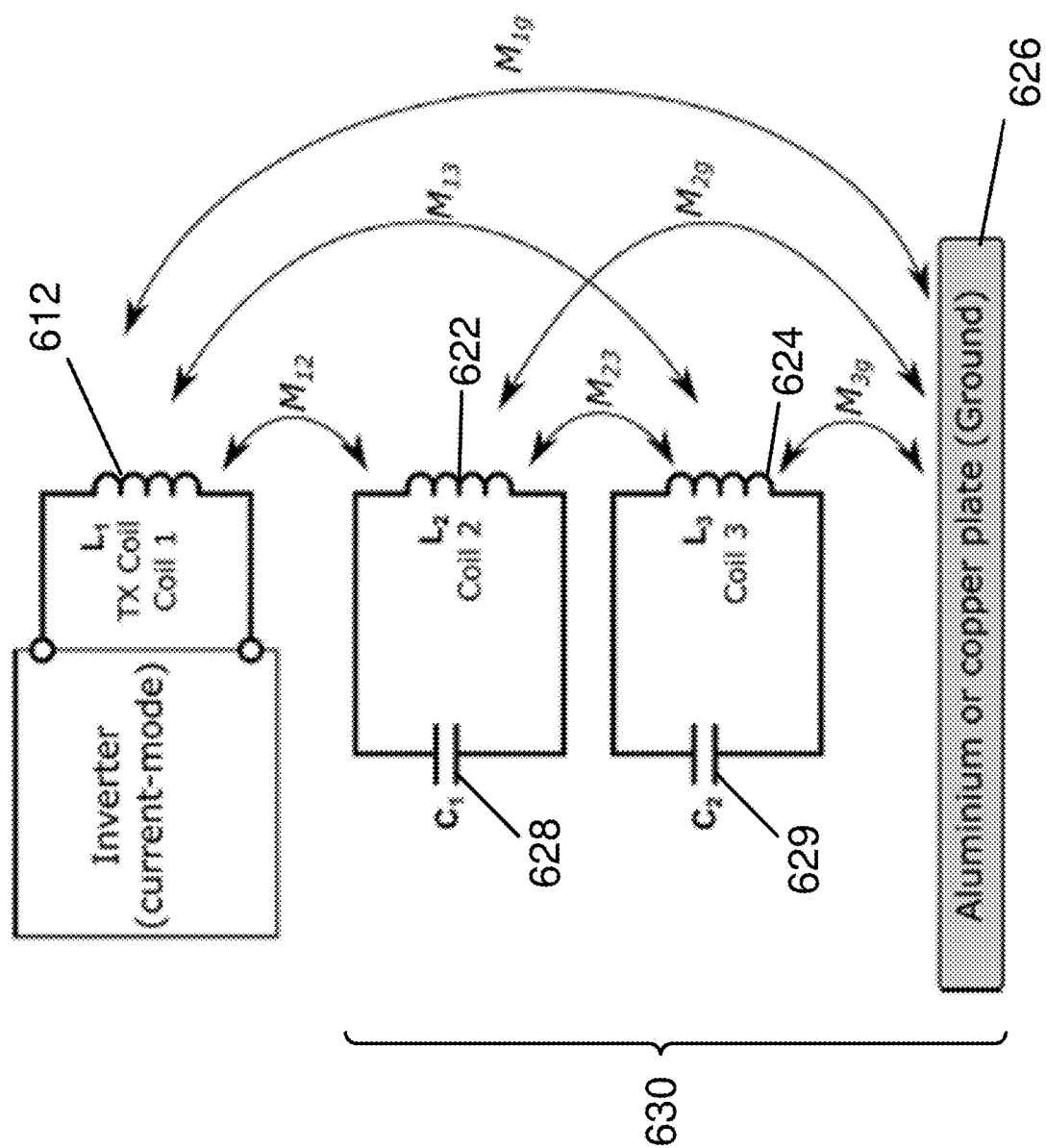
FIG. 6F is an equivalent circuit of a shielding unit and transmitter coil in accordance with an aspect of the disclosure.

FIG. 6F shows the equivalent circuit to the field shielding unit 630 with a first field shielding coil 622, and second field shielding coil 624 and two capacitors 628 and 629.

The reflected impedance as seen from the transmitter coil 612 is:

$$Z_{TX} = r_{TX} + j\omega L_1 + Z_{ref2} + Z_{ref3} + Z_{1gnd} \quad (8)$$

This reflected impedance is similar to the previous configuration. The same criteria should also be met:

$$Z_{ref2} + Z_{ref3} + Z_{1gnd} = 0 \quad (9)$$

However, now expanding the above equation results in the following:

$$\frac{\omega^2 M_{12}^2}{r_{L_2} + j\omega L_2 + \frac{1}{j\omega C_1} + \frac{\omega^2 M_{23}^2}{r_{L_3} + j\omega L_3 + \frac{1}{j\omega C_2} + Z_{3gnd}} + Z_{2gnd}} + \ldots \quad (10)$$

$$\frac{\omega^2 M_{13}^2}{r_{L_3} + j\omega L_3 + \frac{1}{j\omega C_2} + \frac{\omega^2 M_{23}^2}{r_{L_2} + j\omega L_2 + \frac{1}{j\omega C_1} + Z_{2gnd}} + Z_{3gnd}} + Z_{1gnd} = 0$$

It can be noticed in the above equation that now the first and second terms can be controlled by adjusting the values of $C_1$ and $C_2$. The following conclusion can then be made:

The values of $C_1$ and $C_2$ are such that the reflected impedances $Z_{ref2}$ and $Z_{ref3}$ from the first field shielding coil 622 and the second field shielding coil 624, respectively, are positive, i.e. inductive to cancel the negative reflected impedance of the conductive plate 626. This means that the resonant frequency of the first field shielding coil 622 and the second field shielding coil 624 have to be higher than the operating frequency of the transmitter coil 612 of a wireless power transfer system which in this embodiment is a magnetic induction system.

In this embodiment, the field shielding unit 630 comprises a first field shielding coil 622 and a second field shielding coil 624 positioned to attenuate the magnetic field strength on the side of the transmitter coil 612 opposite the receiver coil, and a conductive plate 626 is then added on the side of the field shielding coils 622 and 624, opposite the transmitter coil 612, to eliminate any residual magnetic field. The unintended effect of implementing the field shielding unit 630 is that the field shielding coils 622 and 624 will also create a small amount of attenuation of the magnetic field in the direction towards the receiver coil of the receiver. The result of attenuation of the magnetic field towards the receiver coil results in an efficiency penalty due to currents flowing in the first and second field shielding coils 622 and 624, respectively. The efficiency penalty is in the range of 1% to 5% reduction in efficiency of power transfer from transmitter coil 612 to receiver coil. This efficiency penalty is insignificant compared with the efficiency penalty found with the use of cancellation or shielding units or systems that are 180 degrees out of phase.

While various configurations of the field shielding unit have been described in use with a particular wireless power transfer system one of skill in the art will recognize that a variety of wireless power systems can be used with the various field shielding unit configurations. For example, the previously described wireless power system 200 may comprise a non-resonant system, wherein the transmitter 202 and the receiver 204 are not self-resonant, and/or are not operating at a resonant frequency. The wireless power transfer system 200 may comprise a resonant system, wherein both the transmitter 202 and the receiver 204 are self-resonant and/or operate at the same resonant frequency. The wireless power transfer system 200 may comprise a high frequency inductive wireless power transfer system, as described in above-incorporated U.S. patent application Ser. No. 17/018, 328.

Further, while specific embodiments of field shielding units have been described, one of skill in the art will recognize that other embodiments and configurations are also possible. For example, while the embodiments described herein are in relation to a transmitter coil of a wireless power transfer system, one of skill in the art will recognize that the field shielding unit configurations disclosed may also be applied to the receiver coil in a wireless power transfer system, and such embodiments of a receiver with the various field shielding units disclosed are supported by the figures and description disclosed herein. The wireless power transfer system may be a magnetic induction system or a resonant magnetic system.

Figure 7:
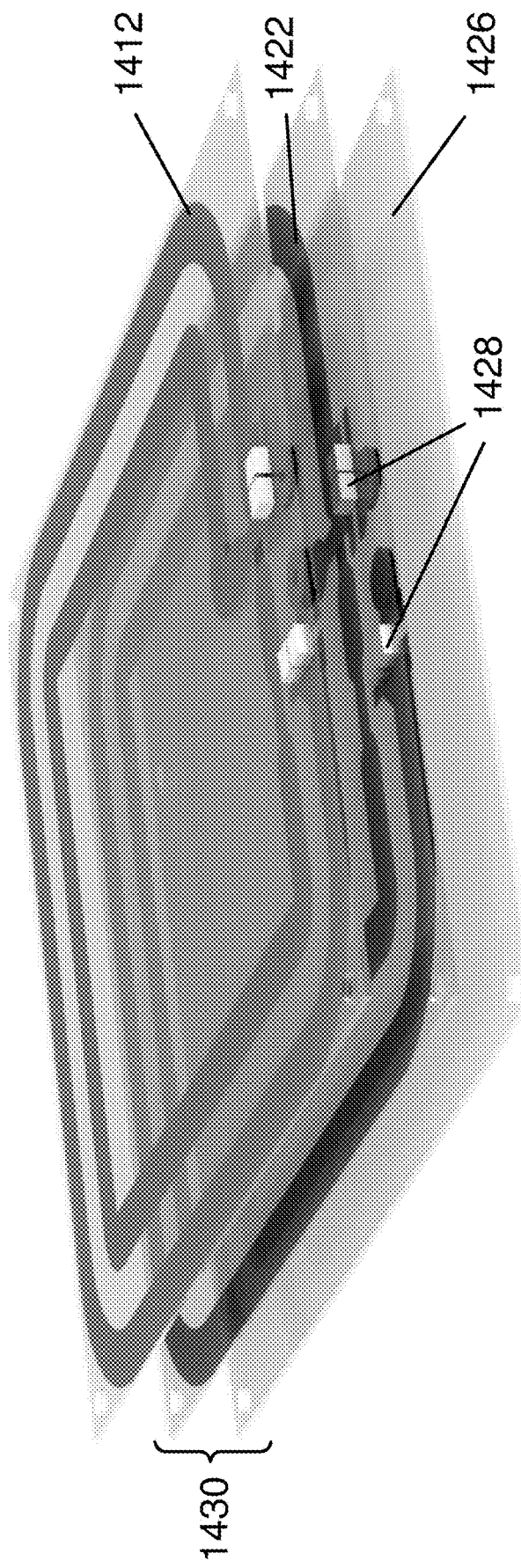
FIG. 7 is a perspective view of a transmitter coil and an apparatus in accordance with an aspect of the disclosure.

While a field shielding unit 430 or apparatus has been described, one of skill in the art will appreciate that other embodiments are possible. Turning to FIG. 7, an apparatus 1430 for use in a magnetic induction wireless power transfer system is shown. The apparatus 1430 is for increasing a magnetic field generated by an active coil of a magnetic induction wireless power transfer system. The magnetic induction wireless power transfer system may be the described wireless power transfer system 200.

In the illustrated arrangement, the apparatus 1430 comprises a single booster coil 1422 and a conductive plate 1426. The booster coil 1422 is electrically connected to a discrete capacitor 1428. The capacitor 1428 is external to the booster coil 1422. The capacitor 1428 is electrically connected across the two terminals of the booster coil 1422.

The booster coil 1422 is configured to strengthen or increase the magnetic field generated by the transmitter coil 1412 of the magnetic induction wireless power transfer system. Specifically, the booster coil 1422 is configured to increase the magnitude of the magnetic field generated by the transmitter coil 1412. The conductive plate 1426 is configured to at least partially attenuate or block the magnetic field generated by the transmitter coil 1412 in a direction generally opposite a receiver coil relative to the transmitter coil 1412. The conductive plate 1426 or conductor is sized and positioned to encompass the booster coil 1422.

For the purposes of the subject disclosure, the conductive plate 1426 is said to encompass the booster coil 1422 when at least one of the following conditions exist: (i) if the area defined by the perimeters of the booster coil 1422 are projected onto the area of the conductive plate 1426, the projection is entirely within the area of the conductive plate 1426; (ii) the projected area of the booster coil 1422 is circumscribed by the area of the conductive plate 1426; and (iii) the area of the conductive plate 426 is greater than the total area defined by the perimeter of the booster coil 1422 by at least the distance between the booster coil 1422 and the conductive plate 1426.

In the illustrated arrangement, the conductive plate 1426 is an elongate plate. The conductive plate 1426 may be comprised of any conductive material including, for example, copper, aluminum, steel.

In the illustrated arrangement, the booster coil 1422 has the same configuration as the transmitter coil 1412. The booster coil 1422 has the same dimensions, size and shape as the transmitter coil 1412.

The apparatus 1430 is positioned such that the booster coil 1422 is opposite a receiver coil with respect to the transmitter coil 1412. The receiver coil is part of a wireless power transfer system of which the transmitter coil 1412 forms a part. The positioning of the apparatus 1430 is such that the booster coil 1422 is adjacent one side of the transmitter coil 1412 while a receiver coil is adjacent another, opposite side of the transmitter coil 1412. The transmitter coil 1412 is adjacent one side of the booster coil 1422, and the conductive plate 1426 is adjacent to the other side of the booster coil 1422.

The apparatus 1430 is positioned such that a plane formed by the field shielding coil 1422 is parallel with a plane formed by the transmitter coil 1412. The plane formed by the field shielding coil 1422 is also parallel with a plane formed by the conducive plate 1426. The plane formed by the conductive plate 1426 is parallel with the plane formed by the transmitter coil 1412. Thus, planes formed by the transmitter and booster coils 1412, 1422 and the conductive plate 1426 are all parallel. The plane of any one of the transmitter and booster coils 1412, 1422 and conductive plate 1426 may be defined as a major object plane of the particular element.

While the apparatus 1430 is shown as comprising the conductive plate 1426, one of ordinary skill in the art will appreciate that other configurations are possible. In another embodiment, the apparatus 1430 does not comprise the described conductive plate 1426.

The booster coil 1422 and capacitor 1428 are configured such that the current in the transmitter coil 1412 is approximately unchanged due to the introduction of the apparatus 1430. For example, if the current in the transmitter coil 1412 is approximately 1 A prior to the introduction of the apparatus 1430, the current in the transmitter coil 1412 is still approximately 1 A after the introduction of the apparatus 1430. Furthermore, the current in the booster coil 1422 is equal to the current in the transmitter coil 1412. Thus, in the described example, the current in booster coil is approximately 1 A during use as will be described.

The capacitance of the capacitor 1428 is selected such that the booster coil 1422 and the capacitor 1428 produce a net positive reactance. As such, there is a net positive reactance, and the impedance or reactance of the transmitter coil 1412 is increased. Thus, a wireless power system comprising the transmitter coil 1412 may require retuning upon introduction of the apparatus, in particular, the booster coil 1422 and capacitor 1428.

The capacitance of the capacitor 1428 is given by equation (11):

$$C = \frac{1}{\omega^2 (L_2 + M_{12})} \tag{11}$$

where C is the capacitance of the capacitor 1428, co is the operating frequency of the wireless power transfer system, $L_2$ is the inductance of the booster coil 1422, and $M_{12}$ is the mutual inductance between the transmitter coil 1412 and the booster coil 1422.

The current in the booster coil 1422 increases the magnitude of the magnetic field generated by the transmitter coil 1412, thereby increasing the power transferred to the receiver, without increasing the current in the transmitter coil 1412. It may be preferable to not increase the current in the transmitter coil 1412 as increasing the current in the transmitter coil 1412 may increase losses in the transmitter coil 1412. For example, conduction and ohmic losses which are proportional to the square of the current may be increased by increasing the current in the transmitter coil 1412. Therefore, increasing the current in the transmitter coil 1412 to increase the strength or magnitude of the magnetic field generated by the transmitter coil 1412, may result in increased losses which may be undesirable.

The booster coil 1422 does not increase the current in the transmitter coil 1412, but, in contrast, maintains a current in the booster coil 1422, which is approximately the same as the current in the transmitter coil 1412. This additional current may increase the voltage induced at the receiver by the transmitter coil 1412.

The resonant frequency of the apparatus 1430, in particular of the booster coil 1422 and the capacitor 1428, is higher than the operating frequency of the wireless power transfer system.

The current in the booster coil 1422 is in phase with the current in the transmitter coil 1412. Thus, the magnetic field generated by the current in the booster coil 1422 is in phase with the magnetic field generated by the transmitter coil 1412. Accordingly, the magnetic field generated by the booster coil 1422 effectively adds to the magnetic field generated by the transmitter coil 1412. The increased magnetic field induces a greater voltage in the receiver thereby increasing power transfer between the transmitter and receiver.

As previously stated, the booster coil 1422 is adjacent the transmitter coil 1412 of the wireless power transfer system. The distance between the transmitter and booster coils 1412 and 1422 is generally uniform. Furthermore, the distance between the booster coil 1422 and the conducive plate 1426 is generally uniform. An optimal separation distance exists between the booster coil 1422 and the transmitter coil 1412 depending on parameters of the wireless power transfer system.

Positioning the booster coil 1422 far from the transmitter coil 1412 increases the required capacitance of the capacitor 1428 to induce a current in the booster coil which is approximately the same as the current in the transmitter coil 1412. Furthermore, positioning the booster coil 1422 too close to the conductive plate 1426 may result in large eddy current losses. These losses may reduce power transfer and reduce power transfer efficiency. Positioning the booster coil 1422 as close as possible to the transmitter coil 1412 decreases the capacitance required at the capacitor 1428 such that the required capacitive values are impractical to achieve.

Accordingly, the apparatus 1430 is positioned such that the booster coil 1422 is as close as possible to the transmitter coil 1412 within the practical limits of the required capacitance values of the capacitor 1428, and such that the booster coil 1422 is as close as possible to the conductive plate 1426 without significant eddy current losses.

In operation, the apparatus 1430 is positioned opposite a receiver coil of the wireless power transfer system with respect to the transmitter coil 1412. The wireless power transfer system includes a transmitter comprising the transmitter coil 1412, and a receiver comprising the receiver coil. The booster coil 1422 and capacitor 1428 strengthen the magnetic field originating from or generated by the transmitter coil 412 towards the receiver coil. As the capacitance of the capacitor 1428 is selected such that a current in the booster coil 1422 is approximately equal to a current in the transmitter coil 1412 during wireless power transfer, a transmitter comprising the transmitter 1412 requires retuning upon introduction of the apparatus 1430. However, the magnetic field strength is significantly increased. In particular, the magnetic field generated by the transmitter coil 1412 is doubled or increased by a factor of two by the apparatus 1430.

The conductive plate 1426, positioned on the side of the field shielding coil 1422 opposite the transmitter coil 1412, attenuates residual magnetic field originating from or generated by the transmitter coil 1412 towards the conductive plate 1426 or away from the receiver coil. As will be appreciated, use of the apparatus 1430 without the conductive plate 1426 would still strengthen the magnetic field.

While the apparatus 1430 has been described as comprising a single booster coil 1422, one of skill in the art will appreciate that other configurations are possible. In another embodiment, the apparatus comprises more than one booster coil. The apparatus further comprises more than capacitor. Each capacitor is electrically connected to a respective booster coil as previously described. As previously described, the capacitances of the capacitors are selected such that currents in the respective booster coils are each approximately equal to a current in the active coil during wireless power transfer.

In another embodiment, multiple booster coils 1422 are coplanar. In particular, the major planes of multiple booster coils 1422 are collinear. Multiple booster coils 1422 may define a major plane which is parallel with a major plane of the transmitter coil 1412. In this embodiment, each booster coil 1422 increases the magnitude of the magnetic field generated by the transmitter coil 1412 in a certain zone of the transmitter coil 1412, which corresponds with the location of one of the booster coil 1422. In this manner, multiple booster coils 1422 may be used to produce a magnetic field profile or map generated by the transmitter coil 1422, which has increased magnetic field magnitudes at particular locations.

While the booster coil 1422 has been described as having the same configuration as the transmitter coil 1412, one of skill in the art will appreciate that other configurations are possible. In another embodiment, the booster coil 1422 has a different configuration than the transmitter coil 1412. In particular, the booster coil 1422 has a different size, shape and/or dimension than the transmitter coil 1412. Having a booster coil 1422 with a different configuration may strengthen or increase the magnetic field in certain locations of the transmitter coil. A particular magnetic field profile may be achievable with a particularly shaped booster coil 1422 and transmitter coil 1412 arrangement. This may be beneficial in certain use cases.

Figure 8A:
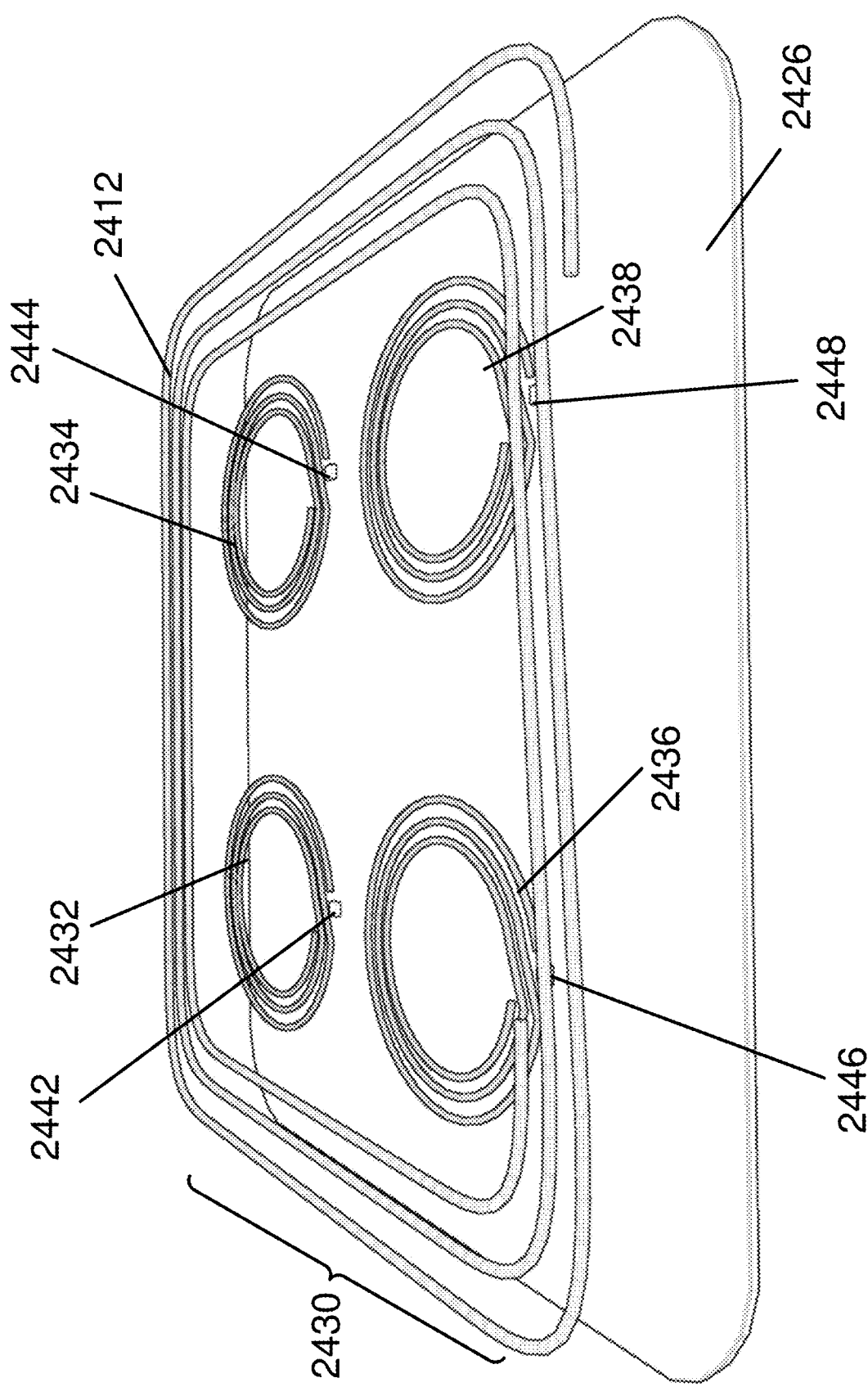
FIG. 8A is a perspective view of a transmitter coil and a portion of an apparatus in accordance with as aspect of the disclosure.
Figure 8B:
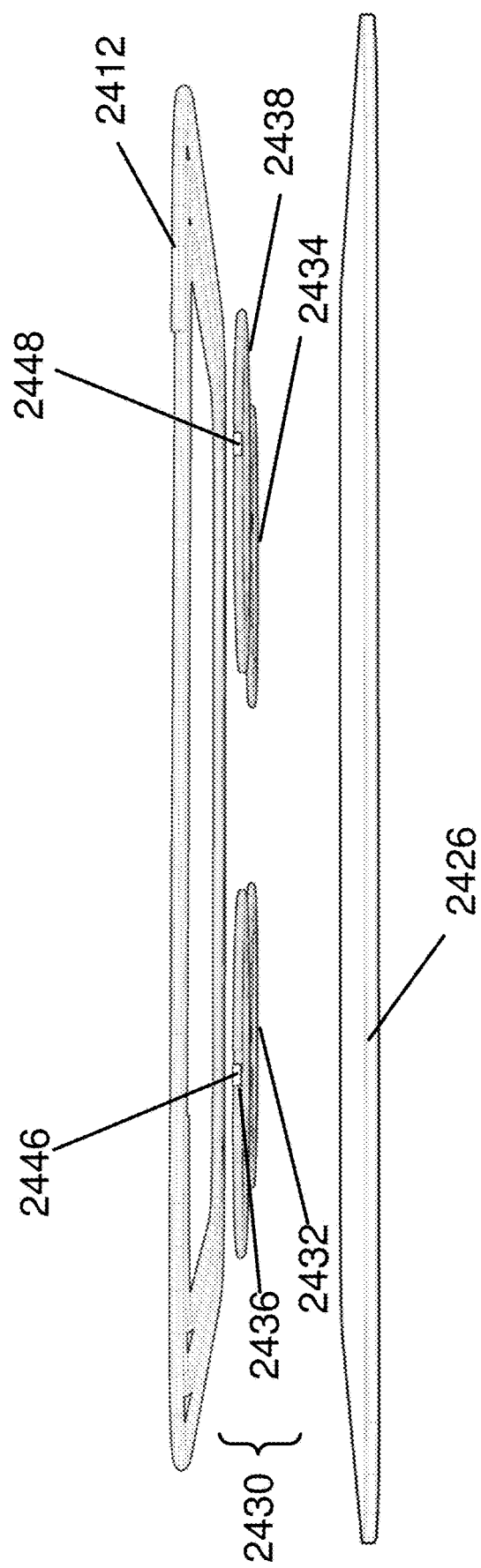
FIG. 8B is a side elevation view of the transmitter and portion of the apparatus of FIG. 8A.

Turning now to FIG. 8A and FIG. 8B, another embodiment of an apparatus 2430 for use in a magnetic induction wireless power transfer system is shown. The apparatus 2430 is for increasing a magnetic field generated by an active coil of a magnetic induction wireless power transfer system. The magnetic induction wireless power transfer system may be the described wireless power transfer system 200.

In the illustrated arrangement, the apparatus 2430 comprises multiple booster coils and a conductive plate 2426. In the illustrated arrangement, the apparatus 2430 comprises four (4) booster coils, although one of skill in art will appreciate that more or fewer booster coils may be used. Specifically, the apparatus 2430 comprises: a first booster coil 2432, a second booster coil 2434, a third booster coil 2436 and a fourth booster coil 2438. Each booster coil is electrically connected to a discrete capacitor 2442, 2444, 2446, 2448. Each capacitor 2442, 2444, 2446, 2448 is external to the respective booster coil 2432, 2434, 2436, 2438. Each capacitor 2442, 2444, 2446, 2448 is electrically connected across the two terminals of the respective booster coil 2432, 2434, 2436, 2438. Capacitors 2442 and 2444, are not visible in FIG. 8B due to the presented side elevation view of the apparatus 2430.

The booster coils 2432, 2434, 2436, 2438 function in the same manner as the described booster coil 1422 unless otherwise stated.

The conductive plate 2426 is configured in the same manner as the described conductive plate 1426 unless otherwise stated.

The apparatus 2430 is positioned such that the booster coils 2432, 2434, 2436, 2438 are opposite a receiver coil with respect to a transmitter coil 2412. The receiver coil is part of a wireless power transfer system of which the transmitter coil 2412 forms a part. The positioning of the apparatus 2430 is such that the booster coils 2432, 2434, 2436, 2438 are adjacent one side of the transmitter coil 2412 while a receiver coil is adjacent another, opposite side of the transmitter coil 2412.

As previously stated, the apparatus 2430 comprises four (4) booster coils 2432, 2434, 2436, 2438. Each capacitor 2442, 2444, 2446, 2448 is external to the respective booster coil 2432, 2434, 2436, 2438. Furthermore, each capacitor 2442, 2444, 2446, 2448 is electrically connected across the two terminals of the respective booster coil 2432, 2434, 2436, 2438. In the illustrated arrangement, a first capacitor 2442 is electrically connected across the two terminals of the first booster coil 2432. A second capacitor 2444 is electrically connected across the two terminals of the second booster coil 2434. A third capacitor 2446 is electrically connected across the two terminals of the third booster coil 2436. A fourth capacitor 2448 is electrically connected across the two terminals of the fourth booster coil 2438.

The first booster coil 2432 is alongside the second booster coil 2434 on one side, and alongside the third booster coil 2436 on another side. The first booster coil 2432 is diagonal from the fourth booster coil 2438. The second booster coil 2434 is alongside the first booster coil 2432 on one side, and alongside the fourth booster coil 2438 on another side. The second booster coil 2434 is diagonal from the third booster coil 2436. The third booster coil 2436 is alongside the first booster coil 2432 on one side, and alongside the fourth booster coil 2438 on another side. The third booster coil 2436 is diagonal from the second booster coil 2434. The fourth booster coil 2438 is alongside the second booster coil 2434 on one side, and alongside the third booster coil 2436 on another side. The fourth booster coil 2438 is diagonal from the first booster coil 2432.

In the illustrated arrangement, the booster coils 2432, 2434, 2436, 2438 are encompassed within the transmitter coil 2412.

For the purposes of the subject disclosure, the transmitter coil 2412 is said to encompass the booster coils 2432, 2434, 2436, 2438 when at least one of the following conditions exist: (i) if the areas defined by the perimeters of the booster coils 2432, 2434, 2436, 2438 are projected onto the area of the transmitter coil 2412, the projection is entirely within the area of the transmitter coil 2412; (ii) the projected areas of the booster coils 2432, 2434, 2436, 2438 are circumscribed by the area of the transmitter coil 2412; and (iii) the area of transmitter plate 1412 is greater than the total area defined by the perimeters of the booster coils 2432, 2434, 2436, 2438.

In the illustrated arrangement, as best illustrated in FIG. 8A, the transmitter coil 2412 is generally square shaped with rounded corners. In the illustrated arrangement, each booster coil 2432, 2434, 2436, 2438 of the apparatus 2430 does not have the same dimension or shape as the transmitter coil 2412. Each booster coil 2432, 2434, 2436, 2438 has a smaller diameter than the length or width of the transmitter coil 2412. Furthermore, each booster coil 2432, 2434, 2436, 2438 has a generally circular shape in contrast with the square shape of the transmitter coil 2412.

In the illustrated arrangement, as best illustrated in FIG. 8B, the booster coils 2432, 2434, 2436, 2438 are parallel. In this respective, parallel is defined as a plane defined by the major surface of each booster coil 2432, 2434, 2436, 2438 is parallel with a plane defined by the major surface of each other booster coil 2432, 2434, 2436, 2438. Accordingly, the booster coils 2432, 2434, 2436, 2438 define one single plane. The single plane defined by the booster coils 2432, 2434, 2436, 2438 is parallel to the plane defined by the major surface of the transmitter coil 2412, and the plane defined by the major surface of the conductive plate 2426.

In operation, the magnetic field may be strengthened or increased at locations corresponding to the locations of the booster coils 2432, 2434, 2436, 2438 of the apparatus 2430. Accordingly, a particular magnetic field map or profile may be achieved through the use of multiple booster coils 2432, 2434, 2436, 2438.

While the apparatus for increasing a magnetic field generated by an active coil of a magnetic induction wireless power transfer system has been described with a conductive plate, in any of the described embodiments of the apparatus, the conductive plate may not be present.

While the apparatuses 1430 and 2430 have been described with respect to a transmitter coil, one of skill in the art will appreciate that the apparatuses may similarly be used with a receiver coil of a receiver of a wireless power transfer system. Apparatuses may be used with both the transmitter coil and receiver coil, or with only a single one of the transmitter and receiver coil. For example, apparatuses comprising the booster coil may be used with the transmitter coil to increase the magnetic field generated by the transmitter coil thereby increasing power transfer to the receiver coil. Apparatuses comprising the field shielding coil may be used with the receiver coil to ensure no retuning is required at the receiver.

What is claimed is:

1. An apparatus for use in a magnetic induction wireless power transfer system, the apparatus comprising:
    at least one booster coil positioned adjacent an active coil of a magnetic induction wireless power transfer system, wherein the booster coil is separate and distinct from the active coil, and a plane defined by the booster coil is non-coplanar with a plane defined by the active coil; and
    a capacitor electrically connected to the booster coil, a capacitance of the capacitor selected such that an amplitude of a current in the booster coil is constant and approximately equal to an amplitude of a current in the active coil during wireless power transfer, and a phase of the current in the booster coil is constant and approximately equal to a phase of the current in the active coil during wireless power transfer, wherein a resonant frequency of the apparatus is higher than an operating frequency of the magnetic induction wireless power transfer system.

2. The apparatus of claim 1, wherein the capacitance of the capacitor is selected such that at least one of (i) the apparatus generates a net positive reactance, and (ii) an impedance or reactance of the active coil is increased.

3. The apparatus of claim 1, wherein a plane of the active coil is parallel with a plane of the booster coil.

4. The apparatus of claim 1, further comprising:
    a conductor positioned adjacent the booster coil opposite the active coil, the conductor encompassing the booster coil.

5. The apparatus of claim 4, wherein a distance between the booster coil and the active coil and a distance between the booster coil and the conductor are selected such that a required capacitance of the capacitor and eddy current losses in the conductor are optimized.

6. The apparatus of claim 1, comprising a plurality of booster coils.

7. The apparatus of claim 6, wherein the booster coils are configured to be encompassed by the active coil.

8. The apparatus of claim 6, wherein the booster coils are configured to increase a magnetic field generated by the active coil according to a magnetic field profile.

9. The apparatus of claim 4, wherein the conductor comprises a conductive plate.

10. The apparatus of claim 4, wherein a plane defined by the conductor is non-coplanar with the plane defined by the booster coil.

11. The apparatus of claim 10, wherein the plane defined by the conductor is non-coplanar with the plane defined by the active coil.

12. A method of wirelessly transferring power via magnetic induction, the method comprising:
    generating a magnetic field at a transmitter coil to transfer power to a receiver coil via magnetic field coupling; and
    strengthening the generated magnetic field via at least one booster coil positioned adjacent the transmitter coil opposite the receiver coil, a capacitor electrically connected to the booster coil, a capacitance of the capacitor selected such that an amplitude of a current in the booster coil is approximately constant and equal to an amplitude of a current in the transmitter coil during wireless power transfer, and a phase of the current in the booster coil is approximately constant and equal to a phase of the current in the transmitter coil during wireless power transfer, wherein the booster coil is separate and distinct from the transmitter coil, and a plane defined by the booster coil is non-coplanar with a plane defined by the transmitter coil, wherein a resonant frequency of the apparatus is higher than an operating frequency of the magnetic induction wireless power transfer system.

* * * * *